United States Patent
Li et al.

(10) Patent No.: US 10,175,378 B2
(45) Date of Patent: Jan. 8, 2019

(54) SYSTEM AND METHOD OF FOCUSING AN ARRAY LATEROLOG

(75) Inventors: Shanjun Li, Katy, TX (US); Luis Emilio San Martin, Houston, TX (US); Michael S. Bittar, Houston, TX (US); Jing Li, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 764 days.

(21) Appl. No.: 14/403,455

(22) PCT Filed: Jul. 13, 2012

(86) PCT No.: PCT/US2012/046722
§ 371 (c)(1),
(2), (4) Date: Nov. 24, 2014

(87) PCT Pub. No.: WO2014/011186
PCT Pub. Date: Jan. 16, 2014

(65) Prior Publication Data
US 2015/0177406 A1  Jun. 25, 2015

(51) Int. Cl.
*G01V 3/20* (2006.01)
*G01V 3/24* (2006.01)
(52) U.S. Cl.
CPC . *G01V 3/20* (2013.01); *G01V 3/24* (2013.01)
(58) Field of Classification Search
CPC ..................................................... G01V 3/00
USPC ..... 702/7, 9, 11, 12, 179, 183; 324/312, 339
See application file for complete search history.

(56) References Cited

U.S. PATENT DOCUMENTS

| 4,646,026 | A | 2/1987 | Chemali et al. |
| 5,399,971 | A | 3/1995 | Seeman et al. |
| 7,256,582 | B2 | 8/2007 | Gorek et al. |
| 7,756,641 | B2 | 7/2010 | Donadille et al. |
| 2001/0033164 | A1* | 10/2001 | Vinegar ............... E21B 17/003 324/312 |
| 2003/0184299 | A1* | 10/2003 | Strack .................... G01V 11/00 324/323 |
| 2004/0133351 | A1* | 7/2004 | Frenkel ................... G01V 3/28 702/7 |

(Continued)

FOREIGN PATENT DOCUMENTS

| GB | 2141237 A | 12/1984 |
| WO | WO-2004029664 A1 | 4/2004 |

(Continued)

OTHER PUBLICATIONS

"Australian Application Serial No. 2012384925, Response filed Jun. 15, 2016 to First Examiner Report dated Jan. 14, 2016 ", 2 pgs.

(Continued)

*Primary Examiner* — Ricky Ngon
(74) *Attorney, Agent, or Firm* — Gilliam IP PLLC

(57) ABSTRACT

Various embodiments include apparatus and methods to make resistivity measurements in a borehole using tool having an array of electrodes operable to provide focused currents, measure corresponding voltages, and measure corresponding voltage differences to determine resistivity. Tools can be configured to operate at a plurality of modes when voltage differences at some frequencies are effectively unreadable. Additional apparatus, systems, and methods are disclosed.

34 Claims, 15 Drawing Sheets

(56) References Cited

U.S. PATENT DOCUMENTS

2006/0173624 A1 8/2006 Frenkel
2010/0070181 A1 3/2010 Maurer
2013/0257436 A1 10/2013 Bittar

FOREIGN PATENT DOCUMENTS

WO WO-2012067599 A1 5/2012
WO WO-2014011186 A1 1/2014

OTHER PUBLICATIONS

"Gulf Cooperation Council Application Serial No. 24810, Office Action dated Aug. 9, 2016", 6 pgs.
"Mexican Patent Application No. MX/a/2015/000136; Office Action dated Feb. 20, 2017.", 3 pages.
"International Application Serial No. PCT/US2012/046722, International Preliminary Report on Patentability dated Jan. 22, 2015", 6 pgs.
"International Application Serial No. PCT/US2012/046722, International Search Report dated Mar. 5, 2013", 3 pgs.
"International Application Serial No. PCT/US2012/046722, Written Opinion dated Mar. 5, 2013", 5 pgs.
"Australian Application Serial No. 2012384925, First Examiner Report dated Jan. 14, 2016", 2 pgs.
"European Application Serial No. 12740261.8, Office Action dated Feb. 20, 2015", 2 pgs.
"European Application Serial No. 12740261.8, Response filed Aug. 5, 2015 to Office Action dated Feb. 20, 2015", 24 pgs.
MX Application Serial No. MX/a/2015/000136, Search Report, dated Dec. 13, 2017, 2 pages.
"Mexican Application Serial No. MX/a/2015/000136, Second Office Action dated Aug. 1, 2017.", 2 pages.

* cited by examiner

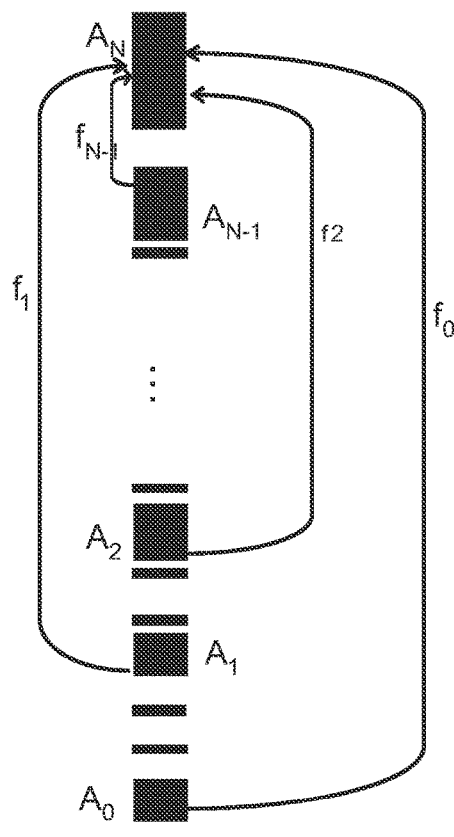
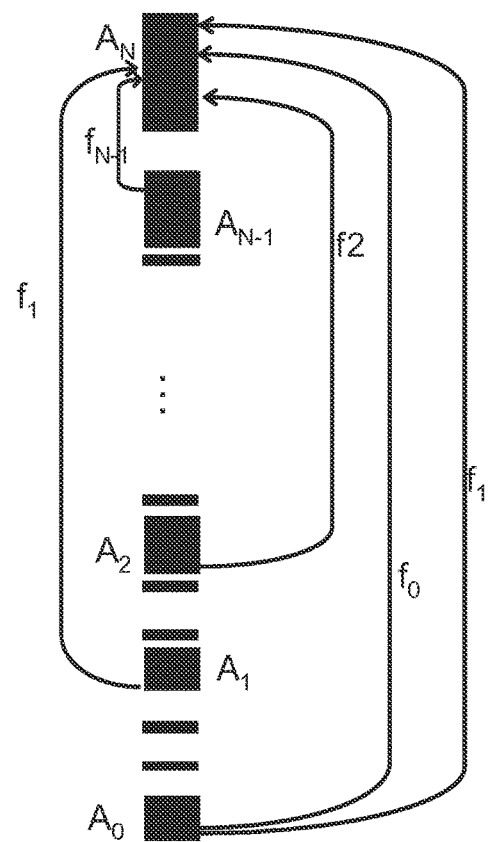
FIG. 4A
FIG. 4B

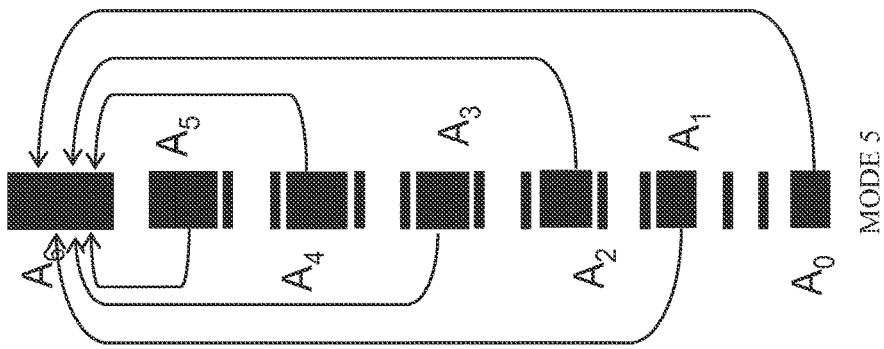
MODE 5    FIG. 5E
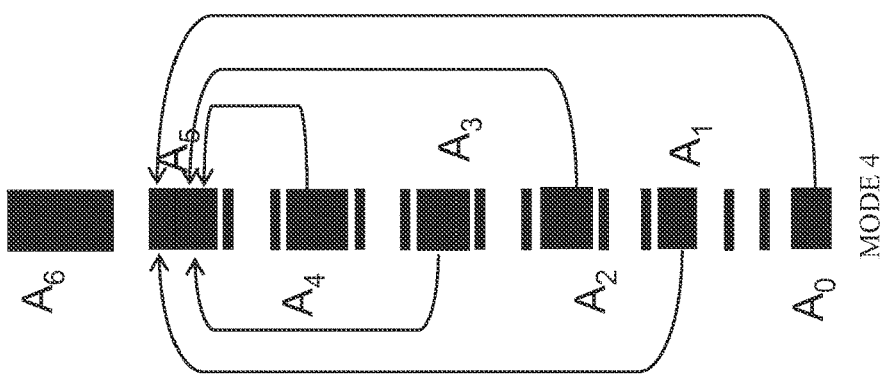
MODE 4    FIG. 5D
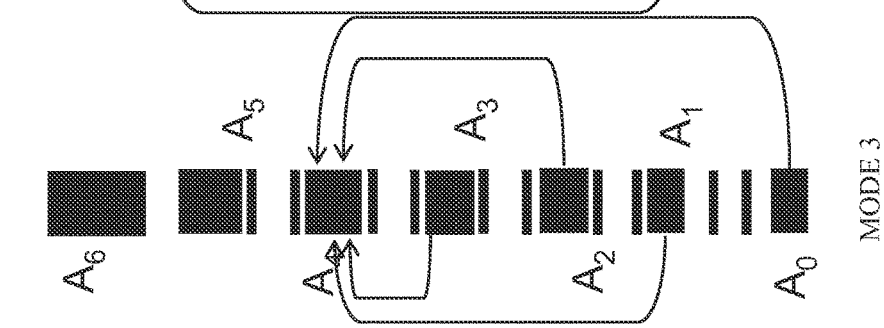
MODE 3    FIG. 5C
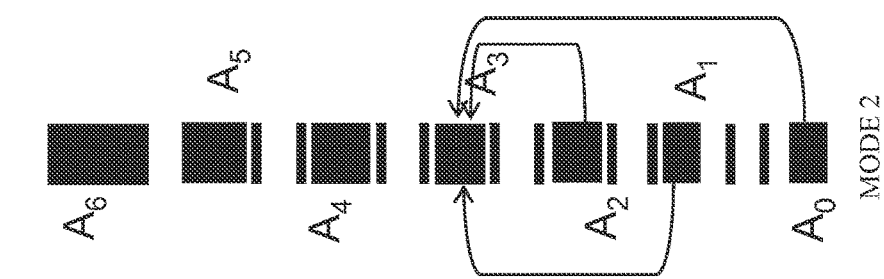
MODE 2    FIG. 5B
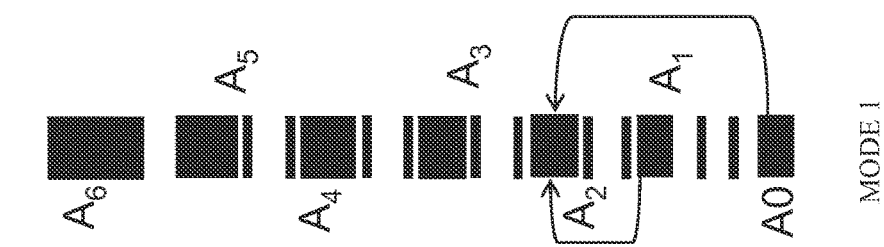
MODE 1    FIG. 5A

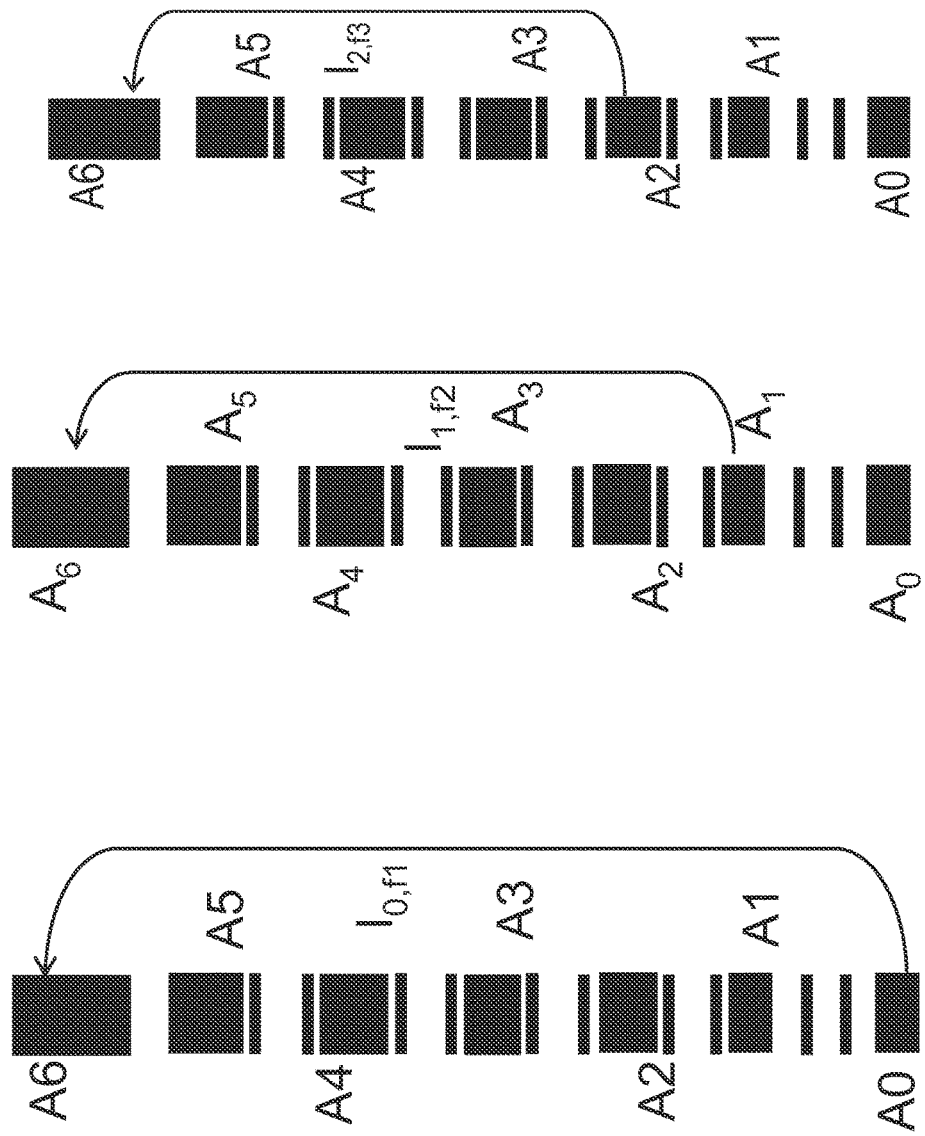

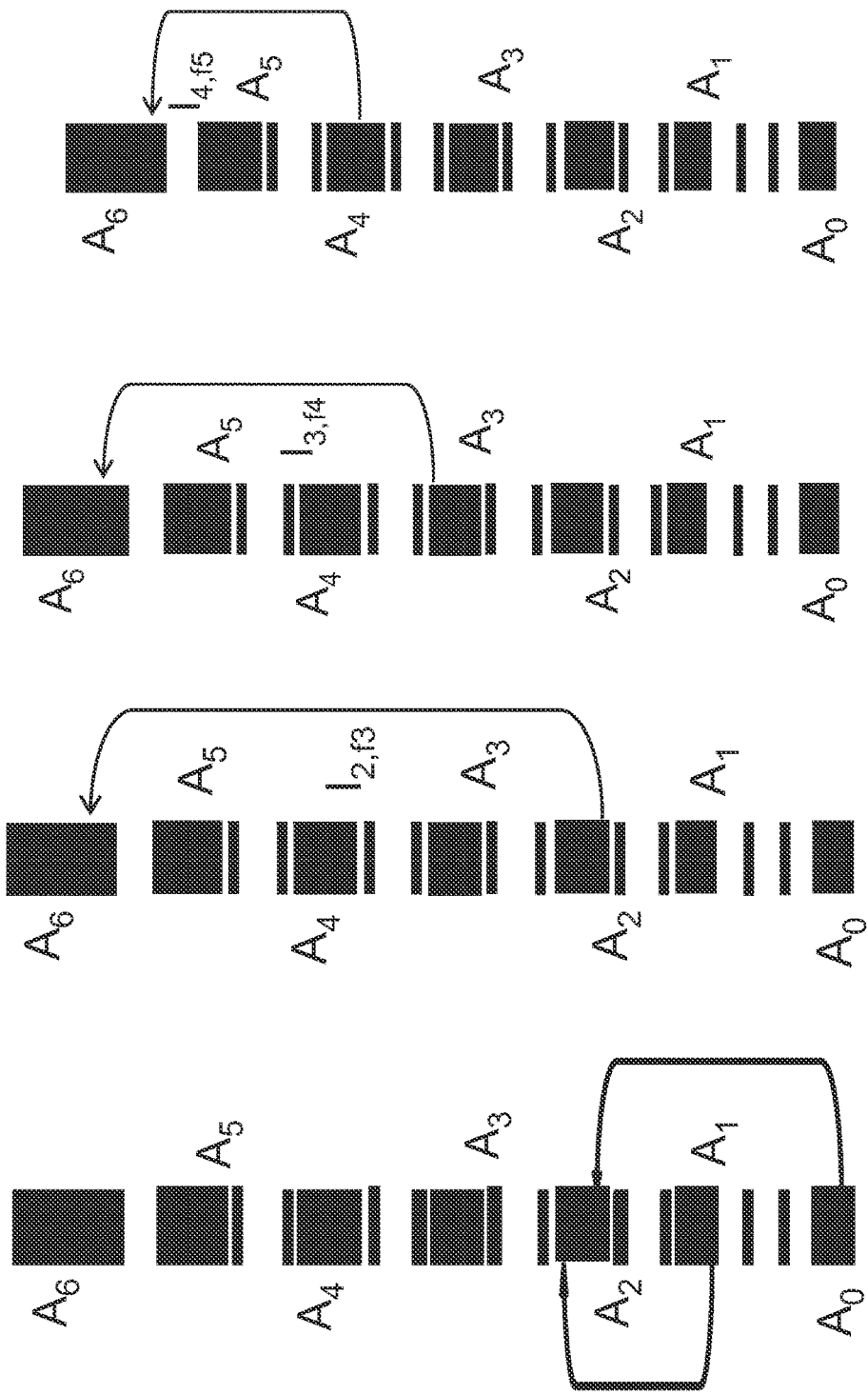

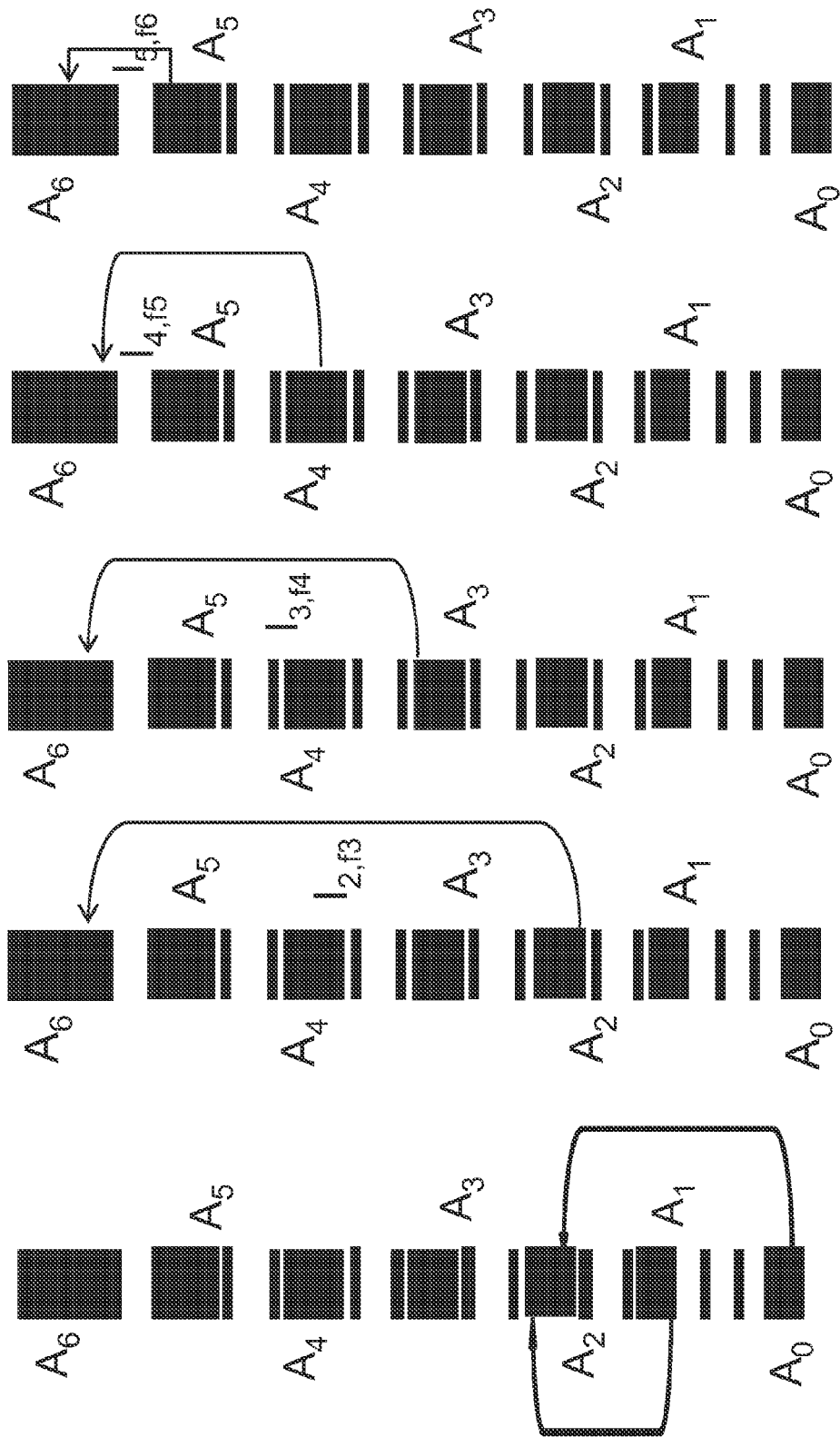

```
┌─────────────────────────────────────────────────────────────────────┐
│  Generate Current from a Main Electrode of a Tool Disposed in a Borehole at a │
│           Frequency Assigned to the Main Electrode                  │
└─────────────────────────────────────────────────────────────────────┘
                                                              └─1410
                                │
┌─────────────────────────────────────────────────────────────────────┐
│ Generate Current from Each Current Electrode in a Sequence of the Tool to the Last │
│ Current Electrode in the Sequence at a Frequency Assigned to the Current Electrode │
└─────────────────────────────────────────────────────────────────────┘
                                                              └─1420
                                │
┌─────────────────────────────────────────────────────────────────────┐
│    Determine Voltages at the Monitor Electrodes in Response to the Currents │
│              Generated from the Current Electrodes                  │
└─────────────────────────────────────────────────────────────────────┘
                                                              └─1430
                                │
┌─────────────────────────────────────────────────────────────────────┐
│ Determine Voltage Differences Between Two Monitor Electrodes Located Next to │
│ Each Other Between Each of Two Adjoining Current Electrodes in the Sequence in │
│                 Response to the Currents Generated                  │
└─────────────────────────────────────────────────────────────────────┘
                                                              └─1440
                                │
┌─────────────────────────────────────────────────────────────────────┐
│     Determine an apparent resistivity based on the determined voltages and the │
│                    determined voltage differences                   │
└─────────────────────────────────────────────────────────────────────┘
                                                              └─1450
```

FIG. 14

```
┌─────────────────────────────────────────────────────────────────────┐
│     Operate a Tool Disposed in a Borehole According to a Plurality of Modes │
└─────────────────────────────────────────────────────────────────────┘
                                                              └─1510
                                │
┌─────────────────────────────────────────────────────────────────────┐
│ Process Voltages Measured from Monitor Electrodes of the Tool, Readable Voltage │
│   Differences Measured Between Two Monitor Electrodes Between Two Adjoining │
│ Current Electrodes of the Tool, and Measured Currents at a Plurality of Frequencies │
│                      According to Each Mode                         │
└─────────────────────────────────────────────────────────────────────┘
                                                              └─1520
```

FIG. 15

SYSTEM AND METHOD OF FOCUSING AN ARRAY LATEROLOG

Priority Application

This application is a U. S. National Stage Filing under 35 U.S.C. § 371 of International Application PCT/US2012/046722, filed on 13 Jul. 2012, and published as WO 2014/011186 A1, which application and publication are hereby incorporated by reference herein in their entirety.

TECHNICAL FIELD

The present invention relates generally to apparatus for making measurements related to oil and gas exploration.

BACKGROUND

In drilling wells for oil and gas exploration, understanding the structure and properties of the associated geological formation provides information to aid such exploration. Measurements in a borehole are typically performed to attain this understanding. However, the environment in which the drilling tools operate is at significant distances below the surface and measurements to manage operation of such equipment are made at these locations.

Logging is the process of making measurements via sensors located downhole, which can provide valuable information regarding the formation characteristics. For example, induction logging utilizes electromagnetic signals that can be used to make deep measurements, which are substantially unaffected by the borehole and the effects of the zone invaded by the drilling. Since induction tools may not offer the most reliable measurements in a high resistivity formation, such as a formation having a resistivity greater than hundreds ohm-m, an array laterolog may offer more accurate measurements in the high resistivity cases. An array laterolog is a current based tool in which a current is generated from the tool and resistivity is determined from measured voltages based on Ohm's law. The array laterolog typically includes a central current electrode with additional current electrodes above and below the central current electrode, where the additional current electrodes are used to achieve focusing. Typically, the additional current electrodes can be arranged to force flow perpendicular to the axis of the logging device in a lateral direction. A resistivity log can be made with the tool in an uncased borehole filled with an electrically conductive material. Further, the usefulness of such measurements may be related to the precision or quality of the information derived from such measurements.

Widely used electrical well logging tools have azimuthal symmetrical structures, which may not offer the most accurate formation resistivity in deviated wells, especially in horizontal wells since boundaries and dipping angle can affect responses. Such tools also may not offer the most accurate measurement of the anisotropy of formation resistivity. To more accurately measure formation resistivity in anisotropic formation and deviated wells, tri-axial induction well logging tools have been developed during the past decade. Since induction tools may not offer reliable measurement in high resistivity formation, such as formation resistivity being greater than a hundred ohm-m, an array laterolog may offer more accurate measurements in the high resistivity cases. A conventional array laterolog can include a central electrode emitting current, with multiple guard electrodes above and below it such that current is sent between different guard electrodes to achieve greater or less focusing.

BRIEF DESCRIPTION OF THE DRAWINGS

FIGS. 4A-4B show examples of current flow patterns of an array laterolog tool, in accordance with various embodiments.

FIGS. 5A-5E show a flow pattern of the currents of five example operational modes, in accordance with various embodiments.

FIGS. 6A-6C show schematically three separated current flow patterns used to form the current flow pattern of mode 1 shown in FIG. 5A, in accordance with various embodiments.

FIGS. 10A-10D shows schematically five separated current flow patterns of a mode 3, in accordance with various embodiments.

FIGS. 11A-E show schematically six separated current flow patterns of a mode 4, in accordance with various embodiments.

FIG. 14 shows features of an example method of using a tool to determine resistivity of a formation around a borehole, in accordance with various embodiments.

FIG. 15 shows features of an example method of using a tool to determine resistivity of a formation around a borehole, in accordance with various embodiments.

DETAILED DESCRIPTION

Figure 1:
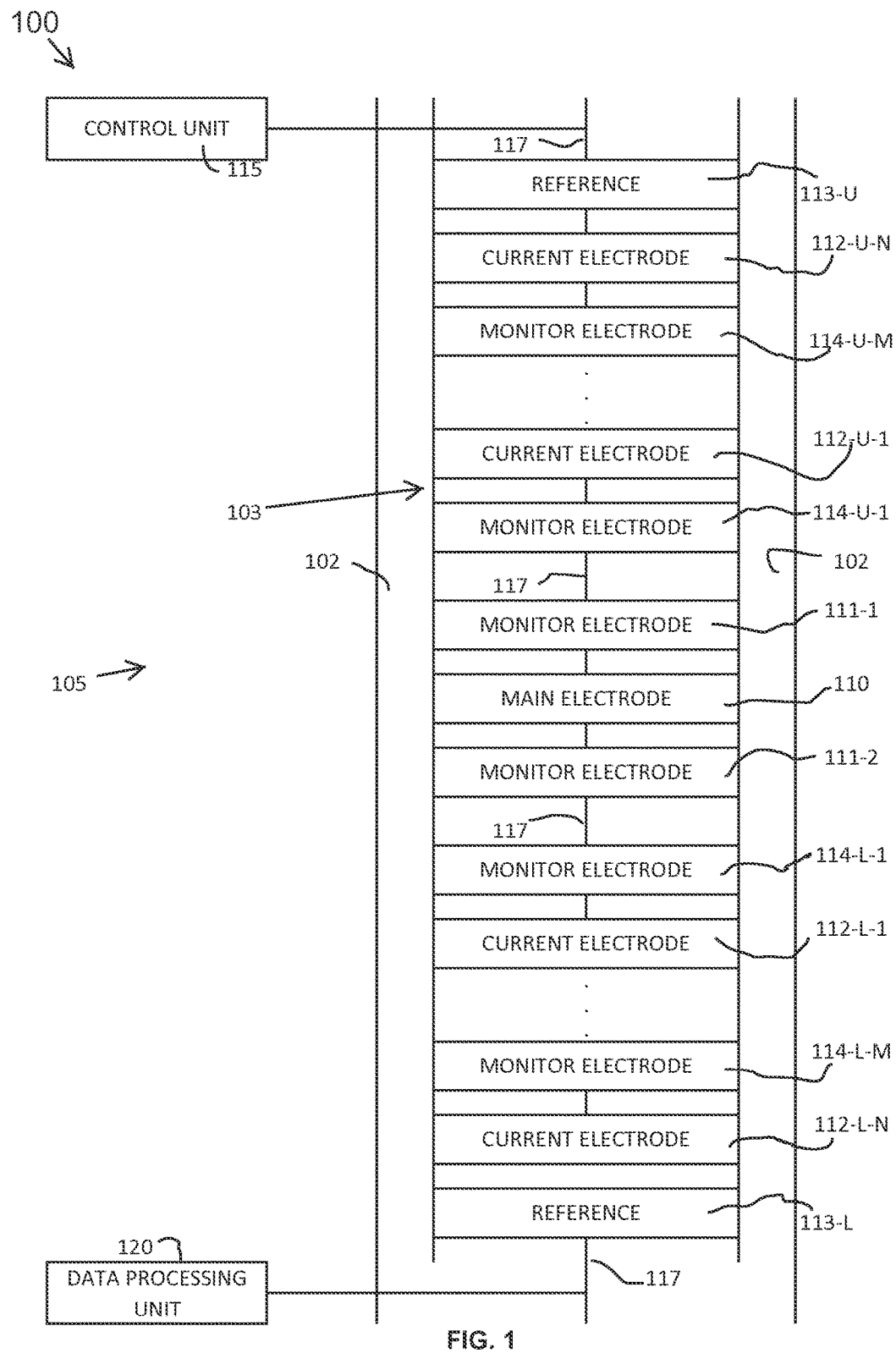
FIG. 1 shows a block diagram of an example system to determine formation resistivity, in accordance with various embodiments.

The following detailed description refers to the accompanying drawings that show, by way of illustration and not limitation, various embodiments in which the invention may be practiced. These embodiments are described in sufficient detail to enable those skilled in the art to practice these and other embodiments. Other embodiments may be utilized, and structural, logical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

The inventors have discovered that if the resistivity contrast between formation resistivity and borehole mud resistivity is too high, some signals acquired in an array laterolog tool can be too small to be measured accurately by direct use of electronics or the signals at different locations are almost identical such as to make the difference between signals indeterminable or lacking in accurate determination. Such situations can render previous methods using an array laterolog tool inaccurate in certain cases with large errors in apparent resistivity output from the measurement.

In various embodiments, a tool having a number of current electrodes spaced apart from each other in a sequence from a main electrode, two monitor electrodes between the main electrode and a first current electrode of the sequence, and two monitor electrodes located next to each other between each of two adjoining current electrodes in the sequence, can be operated to determine resistivity of a formation around a borehole. Current can be generated from the main electrode and selected ones of the current electrodes according to a selected current pattern. Selected monitor electrodes in the sequence can be monitored, voltages at the selected monitor electrodes can be determined, and voltage differences between selected pairs of monitor electrodes can be determined in response to currents generated according to the selected current pattern. Apparent resistivity can be determined based on the determined voltages and the determined voltage differences, according to the selected current pattern. The tool can be structured as an array laterolog tool.

An array laterolog tool can be controlled to operate under a modified method for the focusing condition of its components to improve the output results, when some of the signals are too small to be measured accurately. This modified method can provide a more stable and robust assessment of the formation resistivity, even when some of the signals are small or unreadable. A modified method can include generating currents from the main and one or more current electrodes such that processing of measured signals includes using the currents from the main and the one or more current electrodes as a survey current. For example, with the voltage difference between monitoring electrodes located between a main electrode and the first current electrode next to the main electrode being indeterminable at one or more frequencies, processing of measured voltages and currents can be conducted with apparent resistivity for each of the operating modes processed being inversely proportional to the current from the main electrode or inversely proportional to the total current emitted from the main electrode and the first current electrode.

FIG. 1 shows a block diagram of an example embodiment of a system 100 structured to determine resistivity of a formation with respect to a drilling operation associated with borehole 102. The system 100 includes a tool 105 having a tool structure 103, a control unit 115, and a data processing unit 120. The tool structure 103 has a main electrode 110, where the main electrode 110 can be operable with electrodes arranged on the tool structure 103 with respect to the main electrode 110 along a longitudinal axis 117 of the tool structure 103.

Monitor electrodes 111-1 and 111-2 can be arranged on either side of and adjacent to the main electrode 110. The main electrode 110 can be arranged as a central electrode with an upper sequence of electrodes 112-U-1 . . . 112-U-N and monitor electrodes 114-U-1 . . . 114-U-M such that the upper sequence provides a first number of electrodes to one side of the main electrode 110 along the axis 117. The arrangement of main electrode 110 can also include a lower sequence of electrodes 112-L-1 . . . 112-L-N and monitor electrodes 114-L-1 . . . 114-L-M such that the lower sequence provides a second number of electrodes to the other side of the main electrode 110 along the axis 117. The upper sequence of the electrodes 112-U-1 . . . 112-U-N and the monitor electrodes 114-U-1 . . . 114-U-N can be arranged such that for each component of the upper sequence there is a component in the lower sequence arranged in substantially the same manner as the component in the upper sequence. In such an arrangement, the upper sequence of the electrodes 112-U-1 . . . 112-U-N and the monitor electrodes 114-U-1 . . . 114-U-M is considered to correspond to the lower sequence of the electrodes 112-L-1 . . . 112-L-N and the monitor electrodes 114-L-1 . . . 114-L-M. The corresponding electrodes of the upper and the lower sequences can be coupled together. This coupling can be realized as a direct connection or using switches. Switches may also be used to selectively couple monitor electrodes next to each other between two adjoining electrodes of the upper electrodes 12-U-1 . . . 112-U-N and monitor electrodes next to each other between two adjoining electrodes of the lower electrodes 112-L-1 . . . 112-L-N. The electrodes 112-U-1 . . . 112-U-N and 112-L-1 . . . 112-L-N can be structured as current electrodes. The number of monitor electrodes can be arranged such that voltages are controlled with respect to current generated from the spaced apart electrodes of the main electrode. Although not shown, more than one monitor electrode can be associated with a given current electrode. Two or more monitor electrodes may be disposed between two adjoining current electrodes.

The control unit 115 can be structured to operably manage generation and control of a current signal from the main electrode 110 and generation and control of current from the electrodes 112-U-1 . . . 112-U-N and 112-L-1 . . . 112-L-N. The control unit 115 can be structured to operably manage measurement of voltages and/or setting voltages of the monitor electrodes 114-U-1 . . . 114-U-M and 114-L-1 . . . 114-L-M. The control unit 115 can be structured to selectively generate current from the main electrode 110 and the electrodes 112-U-1 . . . 112-U-N and 112-L-1 . . . 112-L-N according to a selected pattern. The control unit 115 can be structured to selectively generate current and/or set reference potentials such that measured voltages and generated currents can be used to determine resistivity.

The data processing unit 120 of the system 100 can be structured to process the measured voltages with respect to the generated currents to determine formation resistivity. The data processing unit 120 can be realized as a processing unit with a controller, such as a processor, with a data storage device such that values of measured voltages and generated currents can be processed to provide resistivity data. The tool 105 can be structured with the data processing unit 120 and the control unit 115 both integrated with the tool structure 103 or structured as distributed components.

The control unit 115 can be structured to selectively control the first number of the electrodes 112-U-1 . . . 112-U-N and the second number of the electrodes 112-L-1 . . . 112-L-N such that selected ones of the first number of electrodes and of the second number of electrodes receive current from the main electrode 110 or other electrode in the same respective sequence. The control unit 115 can be arranged to generate current from other selected ones of the first number of electrodes and the second number of electrodes based on a selected current pattern. The control unit 115 can be arranged to adjust the current such that a potential difference between selected ones of the monitored electrodes equals a reference potential. Reference structures 113-U and 113-L may provide a reference with which to measure voltages. Other reference structures can be used. The control unit 115 can be arranged to selectively control the main electrode 110, the first number of electrodes 112-U-1 . . . 112-U-N, and the second number of electrodes 112-L-1 . . . 112-L-N to generate a current pattern. The control unit 115 can also include circuitry to process signals acquired that the monitor electrodes 114-U-1 . . . 114-U-M and 114-L-1 . . . 114-L-M. Such circuitry can include filters to distinguish signals at different frequencies correlated to currents generated at assigned frequencies. Alternatively, such signal processing can be conducted in the data processing unit 120 or in a combination of the control unit 115 and the data processing unit 120.

Figure 2:
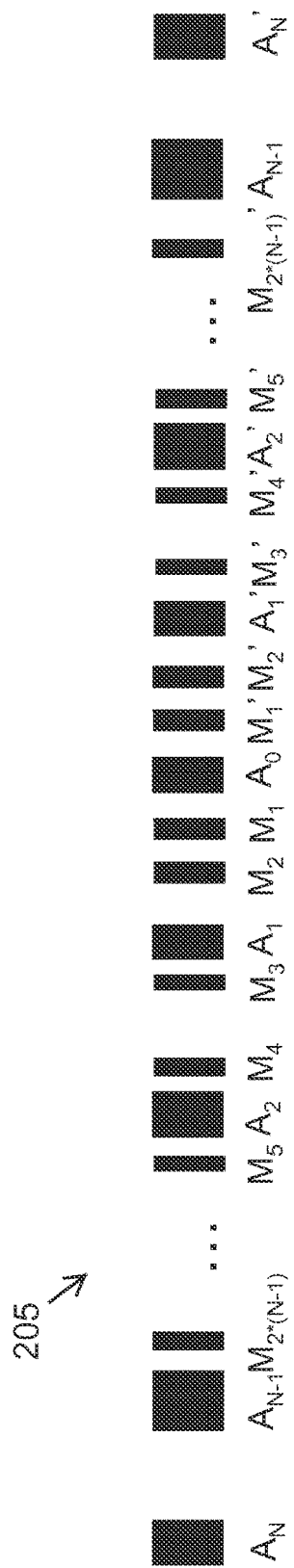
FIG. 2 shows an example configuration of electrodes of an array laterolog tool, in accordance with various embodiments.
Figure 3:
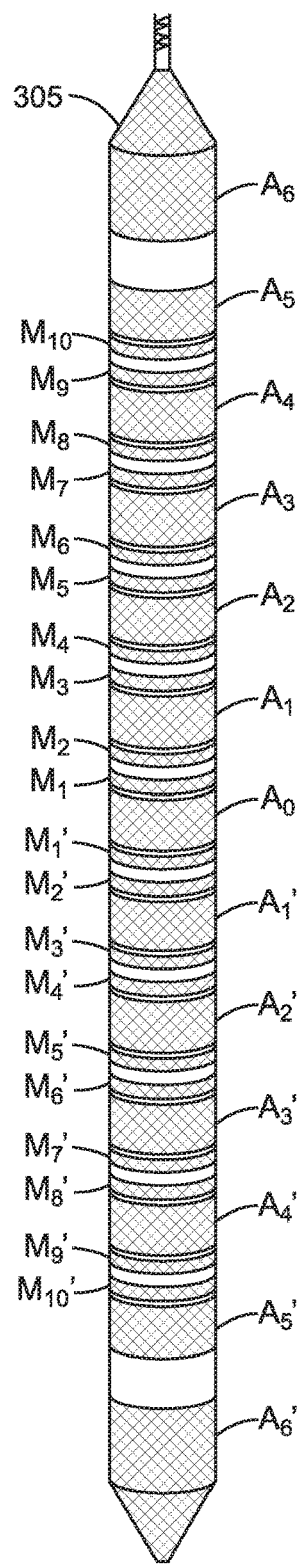
FIG. 3 shows a view of an example array laterolog, in accordance with various embodiments.

FIG. 2 shows a configuration of an embodiment of electrodes of an array laterolog tool 205. The electrodes can include a main electrode $A_0$ that functions as a survey electrode, current emitting electrodes $A_1, A_2, \ldots, A_N$ and current emitting electrodes $A_1', A_2', \ldots, A_N'$ disposed on opposite sides with respect of $A_0$, and voltage monitoring electrodes $M_1, \ldots, M_{2*(N-1)}$, and $M_1', \ldots, M_{2*(N-1)}'$ disposed on opposite sides with respect of $A_0$. Each current electrode $A_i$ and $A_i'$ can be arranged with two monitor electrodes $M_j$ and $M_{j+1}$ and $M_j'$ and $M_{j+1}'$, respectively, with $M_j$ and $M_{j+1}$ on opposite sides of $A_i$ ($M_j'$ and $M_{j+1}'$ on opposite sides of $A_i'$). This arrangement can include monitoring electrodes located next to each other between two adjoining current electrodes. The electrodes $A_1, A_2, \ldots, A_N$ and the electrodes $A_1', A_2', \ldots, A_N'$ can be symmetrically disposed with respect to $A_0$. Electrodes $A_k$ and $A_k'$ can be of different sizes. The electrodes of one side of the survey electrode $A_0$ are balanced with respect to the electrodes of the other side of the survey electrode $A_0$, when there is a voltage equivalence at electrodes having corresponding locations in the arrangement of electrodes. This balancing may be realized with the electrodes having corresponding locations electrically connected. FIG. 3 shows another view of an array laterolog 305 that can be used in systems and methods discussed herein.

FIG. 4A shows a current flow pattern with associated frequencies. The current flows are schematically depicted for half of the current electrodes (electrodes $A_1, A_2, \ldots, A_N$) and the survey electrode $A_0$ of the array laterolog tool 205 of FIG. 2 in a software focusing method. Similar flows are provided in the other half of the current electrodes (electrodes $A_1', A_2', \ldots, A_N'$) and the survey electrode $A_0$. Throughout the description and in some of the figures, only one-half of the current electrodes are shown with respect to current flow patterns for ease of presentation and understanding.

FIG. 4B shows another current flow pattern with its associated frequencies. The current flows are schematically depicted for half the electrodes of the array laterolog tool 205 in a combination hardware/software focusing method. Focusing refers to providing a balance in the measurement procedure, which can be satisfied by setting potentials at selected ones of electrodes equal to selected values, while having other selected ones of electrodes disconnected from being in a current circuit. Software focusing method refers to generating current from the array laterolog tool and measuring potentials without potentials at selected electrodes set equal and using linearity of the measuring environment to determine the quantities being measured from known relationships between current and potential in the measuring environment. Hardware focusing method refers to generating current from an array laterolog tool and measuring potentials with potentials at selected electrodes set equal. Combination hardware/software focusing method refers to using at least one measurement in the measurement procedure by a hardware focusing method with the other measurements made using the software focusing method. In the software focusing, operational method illustrated in FIG. 4A, current electrodes $A_i$ and $A_i'$ (i=0, 1, . . . , N-1) emit current with frequency $f_i$ flowing to $A_N$ and $A_N'$. Comparing FIG. 4B with FIG. 4A, it is seen that the difference between the combination focusing method and the software focusing method is that the combination focusing method the survey electrode $A_0$ emits two currents with different frequencies, $f_0$ and $f_1$.

In various embodiments, in order to reduce the sensitivity to errors in the measurements, two sets of data can be measured. The first set is the potential on the monitor electrodes with odd order or even order measured with respect to a reference electrode. Though one of the sets, odd order or even order, can be used for determining formation resistivity, both can be measured to improve accuracy and to add redundancy. The potentials of the monitoring electrodes are functions of the measuring time, t, and can be expressed as $$UM_i(t) = \sum_{k=0}^{N-1} UM_{i,f_k} \cos(2\pi f_k t + \phi_{i,k}), \quad (1a)$$

$$i = 1, 2, 3, \ldots, 2*(N-1),$$

where N is the number of current electrodes in one-half of the tool, k=0 refers to the main electrode and k=1, . . . , N-1 refers to the other electrodes except the last electrode, $UM_{i,f_k}$ is the amplitude of the potential, or the voltage, with frequency $f_k$ at the $i^{th}$ monitoring electrode, t is the measuring time for each logging position, $\phi_{i,k}$ is the initial phase with respect to frequency $f_k$ on the $i^{th}$ monitor. The measuring time can last several cycles of the lowest frequency among $f_k$ (k=0, . . . , N-1) for each logging position.

The second set, which can be measured, are the voltage differences between monitoring electrodes located next to each other between two adjoining current electrodes. These voltage differences are functions of the measuring time, t, and can be expressed as $$\Delta VM_{i,i+1}(t) = \sum_{k=0}^{N-1} \Delta VM_{i,i+1,f_k} \cos(2\pi f_k t + \phi_{i,i+1,k}), \quad (1b)$$

$$i = 1, 3, 5, \ldots, 2*(N-1)-1,$$

where $\Delta VM_{i,i+1,f_k}$ is the amplitude of the voltage with frequency $f_k$ between $i^{th}$ and $(i+1)^{th}$ monitor electrodes and $\phi_{i,i+1,k}$ is the initial phase of $\Delta VM_{i,i+1,f_k}$ with frequency $f_k$. If the measuring time is discrete $t_j$, $j=1, \ldots, M$, equations (1a) and (1b) become $$UM_i(t_j) = \sum_{k=0}^{N-1} UM_{i,f_k} \cos(2\pi f_k t_j + \phi_{i,k}),$$

$$i = 1, 2, 3, \ldots, 2*(N-1), j = 1, \ldots, M \quad (2a)$$

$$VM_{i,i+1}(t_j) = \sum_{k=0}^{N-1} \Delta VM_{i,i+1,f_k} \cos(2\pi f_k t_j + \phi_{i,i+1,k}),$$

$$i = 1, 3, 5, \ldots, 2*(N-1)-1, j = 1, \ldots, M. \quad (2b)$$

Using a processing procedure such as a fast Fourier transform method or a least-square-method, the amplitude of the voltages and voltage differences, can be processed and expressed as $$UM_{1,f_0}, UM_{2,f_0}, \ldots, UM_{2(N-1),f_0}, \quad (3a)$$

$$UM_{1,f_1}, VM_{2,f_1}, \ldots, UM_{2(N-1),f_1}, \quad (3b)$$

$$\vdots$$

$$UM_{1,f_{N-1}}, UM_{2,f_{N-1}}, \ldots, UM_{2(N-1),f_{N-1}}, \quad (3c)$$

$$\Delta VM_{1,2,f_0}, \Delta VM_{3,4,f_0}, \ldots, \Delta VM_{2(N-1)-1,2(N-1),f_0}, \quad (3d)$$

$$\Delta VM_{1,2,f_1}, \Delta VM_{3,4,f_1}, \ldots, \Delta VM_{2(N-1)-1,2(N-1),f_1}, \quad (3e)$$

$$\vdots$$

$$\Delta VM_{1,2,f_{N-1}}, \Delta VM_{3,4,f_{N-1}} \Delta VM_{2(N-1)-1,2(N-1),f_{N-1}}. \quad (3f)$$

The current emitted by $A_0$ through $A_{N-1}$ can be recorded in a memory device, for example, and labeled as $I_{0,f_0}, I_{1,f_1}, \ldots, I_{(N-1),f_{N-1}}$ for software focusing method and $I_{0,f_0}, I_{0,f_1}, I_{1,f_1}, \ldots, I_{(N-1),f_{N-1}}$ for combination software/hardware focusing method.

The array laterolog tool 205 of FIG. 2 or a similar array laterolog tool can be operated to make the measurements described above that can be used to synthesize N−1 operational modes with the depth of investigation (DOI). (The DOI can be defined in terms of radius.) As seen from FIG. 2, N refers to the number of current electrodes disposed in a half section of the electrodes relative to the survey electrode $A_0$. If N=6, five operational modes can be obtained, as shown in FIGS. 5A-5E, where the arrows indicate schematically the flow pattern of the currents. If all signals are measured and accurate, the five operation modes can be expressed as follows.

For mode 1, the currents emitted by $A_0$ and $A_1$ flow into $A_2$ only, instead of flowing into $A_2$ through $A_N$, and the voltage difference between the monitoring electrodes $M_1$ and $M_2$, $\Delta VM_{1,2}$, is 0 volts. The apparent resistivity can be computed as $$R_{a,Mode1} = k_1 \frac{UM_1}{I_0},$$

where $UM_1$ is the voltage between the monitor electrode M and the reference electrode, and $I_0$ is the total current emitted by the electrode A0, when operation mode 1 is satisfied with respect to the monitor electrodes and the current flow. The factor $k_1$ is the tool's coefficient for mode 1.

For mode 2, the currents emitted by $A_0$, $A_1$, and $A_2$ only flow into $A_3$, while keeping the voltage difference between the monitoring electrodes $M_1$ and $M_2$, $\Delta VM_{1,2}$, and the voltage difference between the monitoring electrodes $M_3$ and $M_4$, $\Delta VM_{3,4}$, at 0 volts. The apparent resistivity can be computed as $$R_{a,Mode2} = k_2 \frac{UM_1}{I_0},$$

where $UM_1$ is the voltage between the monitor electrode M1 and the reference electrode, and $I_0$ is the total current emitted by the electrode A0 when operation mode 2 is satisfied with respect to the monitor electrodes and the current flow. The factor $k_2$ is the tool's coefficient of mode 2.

For mode 3, the currents emitted by $A_0$, $A_1$, $A_2$, and $A_3$ only flow into $A_4$, while keeping the voltage difference between the monitoring electrodes $M_1$ and $M_2$, $\Delta VM_{1,2}$, the voltage difference between the monitoring electrodes $M_3$ and $M_4$, $\Delta VM_{3,4}$, and the voltage difference between the monitoring electrodes $M_5$ and $M_6$, $\Delta VM_{5,6}$, at 0 volts. The apparent resistivity can be computed as $$R_{a,Mode3} = k_3 \frac{UM_1}{I_0},$$

where $UM_1$ is the voltage between the monitor electrode M1 and the reference electrode, and $I_0$ is the total current emitted by the electrode A0 when operation mode 3 is satisfied with respect to the monitor electrodes and the current flow. The factor $k_3$ is the tool's coefficient of mode 3.

For mode 4, the currents emitted by $A_0$, $A_1$, $A_2$, $A_3$, and $A_4$ only flow into $A_5$, while keeping the voltage difference between the monitoring electrodes $M_1$ and $M_2$, $\Delta VM_{1,2}$, the voltage difference between the monitoring electrodes $M_3$ and $M_4$, $\Delta VM_{3,4}$, the voltage difference between the monitoring electrodes $M_5$ and $M_6$, $\Delta VM_{5,6}$, and the voltage difference between the monitoring electrodes $M_7$ and $M_8$, $\Delta VM_{7,8}$, at 0 volts. The apparent resistivity can be computed as $$R_{a,Mode4} = k_4 \frac{UM_1}{I_0},$$

where $UM_1$ is the voltage between the monitor electrode M1 and the reference electrode, and $I_0$ is the total current emitted by the electrode $A_0$ when operation mode 4 is satisfied with respect to the monitor electrodes and the current flow. The factor $k_4$ is the tool's coefficient of mode 4.

For mode 5, the currents emitted by $A_0$, $A_1$, $A_2$, $A_3$, $A_4$ and $A_5$ only flow into $A_6$, while keeping the voltage difference between the monitoring electrodes $M_1$ and $M_2$, $\Delta VM_{1,2}$, the voltage difference between the monitoring electrodes $M_3$ and $M_4$, $\Delta VM_{3,4}$, the voltage difference between the monitoring electrodes $M_5$ and $M_6$, $\Delta VM_{5,6}$, the voltage difference between monitoring the electrodes $M_7$ and $M_8$, $\Delta VM_{7,8}$, and the voltage difference between the monitoring electrodes $M_9$ and $M_{10}$, $\Delta VM_{9,10}$, at 0 volts. The apparent resistivity can be computed as $$R_{a,Mode5} = k_5 \frac{UM_1}{I_0},$$

where $UM_1$ is the voltage between the monitor electrode M1 and the reference electrode, and $I_0$ is the total current emitted by the electrode A0 when operation mode 5 is satisfied with respect to the monitor electrodes and the current flow. The factor $k_5$ is the tool's coefficient of mode 5.

However, the five modes discussed above may not be always practical to implement. This situation may occur when some signals are too small to be read. For example, when the ratio between formation resistivity and mud resistivity is too high, the signals in the measurement can be too small to be determined. Table 1 shows an example of simulated signals at an array laterolog tool in a formation. The model for the formation has a borehole size of 8 inches, a formation resistivity, $R_t$, of 20,000 ohm-m and a mud resistivity, $R_m$, of 0.02 ohm-m, providing the ratio 1,000,000:1. For the simulated signals, the currents $I_{f0}$, $I_{f1}$, $I_{f2}$, $I_{f3}$, $I_{f4}$ and $I_{f5}$ are 0.1(A). If some voltage difference between M1 and M2 are not readable, such as data shown in Tables 2 and 3, the software focusing method does not work. In Table 2, the voltage difference between M1 and M2 for frequencies $f_3$, $f_4$, and $f_5$ can be neglected. In Table 3, the voltage difference between M1 and M2 for frequencies $f_2$, $f_3$, $f_4$, and $f_5$ can be neglected.

TABLE 1

| | $\Delta VM_{1,2}$ | $\Delta VM_{3,4}$ | $\Delta VM_{5,6}$ | $\Delta VM_{7,8}$ | $\Delta VM_{9,10}$ |
|---|---|---|---|---|---|
| f0 | 0.0019048 | 0.003942104 | 0.008902 | 0.0148319 | 0.017776 |
| f1 | 0 | 0.003941374 | 0.008902 | 0.0148314 | 0.0177753 |
| f2 | −3.696E−08 | −4.8342E−07 | 0.008903 | 0.0148321 | 0.0177762 |
| f3 | −2.876E−08 | −2.4775E−07 | −9.09E−07 | 0.0148315 | 0.0177766 |
| f4 | −1.883E−08 | −1.6181E−07 | −6.5E−07 | −1.5E−06 | 0.0177773 |
| f5 | −8.54E−09 | −7.329E−08 | −3E−07 | −8.1E−07 | −1.5E−06 |

TABLE 2

| | $\Delta VM_{1,2}$ | $\Delta VM_{3,4}$ | $\Delta VM_{5,6}$ | $\Delta VM_{7,8}$ | $\Delta VM_{9,10}$ |
|---|---|---|---|---|---|
| $f_0$ | 0.0019048 | 0.003942104 | 0.008902 | 0.0148319 | 0.017776 |
| $f_1$ | 0 | 0.003941374 | 0.008902 | 0.0148314 | 0.0177753 |
| $f_2$ | −3.696E−08 | −4.8342E−07 | 0.008903 | 0.0148321 | 0.0177762 |
| $f_3$ | | −2.4775E−07 | −9.09E−07 | 0.0148315 | 0.0177766 |
| $f_4$ | | −1.6181E−07 | −6.5E−07 | −1.5E−06 | 0.0177773 |
| $f_5$ | | −7.329E−08 | −3E−07 | −8.1E−07 | −1.5E−06 |

TABLE 3

| | $\Delta VM_{1,2}$ | $\Delta VM_{3,4}$ | $\Delta VM_{5,6}$ | $\Delta VM_{7,8}$ | $\Delta VM_{9,10}$ |
|---|---|---|---|---|---|
| $f_0$ | 0.0019048 | 0.003942104 | 0.008902 | 0.0148319 | 0.017776 |
| $f_1$ | 0 | 0.003941374 | 0.008902 | 0.0148314 | 0.0177753 |
| $f_2$ | | −4.8342E−07 | 0.008903 | 0.0148321 | 0.0177762 |
| $f_3$ | | −2.4775E−07 | −9.09E−07 | 0.0148315 | 0.0177766 |
| $f_4$ | | −1.6181E−07 | −6.5E−07 | −1.5E−06 | 0.0177773 |
| $f_5$ | | −7.329E−08 | −3E−07 | −8.1E−07 | −1.5E−06 |

When some small signals are unreadable, such as shown in tables 2 and 3, the five modes operations are altered. For mode 1, the currents emitted by $A_0$ and $A_1$ flow into $A_2$ only, instead of flowing into $A_2$ through $A_N$, and the voltage difference between the monitoring electrodes $M_1$ and $M_2$, $\Delta VM_{1,2}$, is 0 volts. The apparent resistivity can be computed as $$R_{a,Mode1} = k_1 \frac{UM_1}{I_0},$$

where $UM_1$ is the voltage between the monitor electrode $M_1$ and the reference electrode. $I_0$ is the current emitted by the electrode A0 with frequency $f_1$ if the measured data is like that shown in Table 3, where the voltage difference between $M_1$ and $M_2$ for frequencies $f_2$, $f_3$, $f_4$, and $f_5$ can be neglected, when operation mode 1 is satisfied. $I_0$ is the total current emitted by electrode A0 with frequencies $f_0$ and $f_1$ if the measured signals are like that shown in Table 2, where the voltage difference between $M_1$ and $M_2$ for frequencies $f_3$, $f_4$, and $f_5$ can be neglected. The factor $k_1$ is the tool's coefficient of mode 1.

Since the voltage differences between $M_1$ and $M_2$ are not readable for frequencies $f_2$ to $f_5$ for measurements like Table 3, or for frequencies $f_3$, $f_4$, and $f_5$ for measurements like Table 2, for the other 4 modes of operation, the electrodes $A_0$, $A_1$, and $A_1'$ can be taken to be combined together to be a survey electrode with the total current emitted by $A_0$, $A_1$, and $A_1'$, expressed by $I_{model}$, kept as survey current.

For mode 2, the currents emitted by $A_0$, $A_1$ and $A_2$ flow into A3, while keeping the voltage differences between the monitoring electrodes $M_3$ and $M_4$, $\Delta VM_{3,4}$, at 0 volts. The apparent resistivity for mode 2 can be computed as $$R_{a,Mode2} = k_2 \frac{UM_1}{I_{model}},$$

where $UM_1$ is the voltage between the monitor electrode $M_1$ and the reference electrode with $I_{model}$ being the total current emitted by $A_0$, $A_1$, and $A_1'$. The factor $k_2$ is the tool's coefficient of mode 2.

For mode 3, the currents emitted by $A_0$, $A_1$, $A_2$, and $A_3$ only flow into $A_4$, while keeping the voltage differences between monitoring electrodes $M_3$ and $M_4$, $\Delta VM_{3,4}$, and the voltage differences between monitoring electrodes $M_5$ and $M_6$, $\Delta VM_{5,6}$, at 0 volts. The apparent resistivity for mode 3 can be computed as $$R_{a,Mode3} = k_3 \frac{UM_1}{I_{model}},$$

where $UM_1$ is the voltage between the monitor electrode $M_1$ and the reference electrode with $I_{model}$ being the total current emitted by $A_0$, $A_1$, and $A_1'$. The factor $k_3$ is the tool's coefficient of mode 3.

For mode 4, the currents emitted by $A_0$, $A_1$, $A_2$, $A_3$, and $A_4$ only flow into $A_5$, while keeping the voltage differences between monitoring electrodes $M_3$ and $M_4$, $\Delta VM_{3,4}$, the voltage differences between monitoring electrodes $M_5$ and $M_6$, $\Delta VM_{5,6}$, and the voltage differences between monitoring electrodes $M_7$ and $M_8$, $\Delta VM_{7,8}$, at 0 volts. The apparent resistivity for mode 4 can be computed as $$R_{a,Mode4} = k_4 \frac{UM_1}{I_{model}},$$

where $UM_1$ is the voltage between the monitor electrode $M_1$ and the reference electrode with $I_{model}$ being the total current emitted by $A_0$, $A_1$, and $A_1'$. The factor $k_4$ is the tool's coefficient of mode 4.

For mode 5, the currents emitted by $A_0$, $A_1$, $A_2$, $A_3$, $A_4$, and $A_5$ flow into $A_6$, while keeping the voltage differences between monitoring electrodes $M_3$ and $M_4$, $\Delta VM_{3,4}$, the voltage differences between monitoring electrodes $M_5$ and $M_6$, $\Delta VM_{5,6}$, the voltage differences between monitoring electrodes $M_7$ and $M_8$, $\Delta VM_{7,8}$, and the voltage differences between monitoring electrodes $M_9$ and $M_{10}$, $\Delta VM_{9,10}$, at 0 volts. The apparent resistivity for mode 5 can be computed as $$R_{a,Mode5} = k_5 \frac{UM_1}{I_{model}},$$

where $UM_1$ is the voltage between the monitor electrode $M_1$ and the reference electrode with $I_{model}$ being the total current emitted by $A_0$, $A_1$, and $A_1'$. The factor $k_5$ is the tool's coefficient of mode 5.

In various embodiments, a software focusing methodology can be implemented to compute apparent resistivity when the small signals between the monitor electrodes M1 and M2 are not readable. In a software focusing method, survey electrode $A_0$ only emits one current with frequency $f_0$, as shown in FIG. 4A. FIGS. 6A-C shows schematically three separated current flow patterns used to form the current flow pattern of mode 1 shown in FIG. 5A. FIGS. 6A, 6B, and 6C represent the currents emitted by $A_0$, $A_1$, and $A_2$ flowing to $A_6$, respectively. The operation of mode 1 can be realized by following conditions.

$$I_{2,f_3}{}^T = -(I_{0,f_1}{}^T + I_{1,f_2}{}^T), \tag{4}$$

where $I_{0,f_1}{}^T$, $I_{1,f_2}{}^T$, and $I_{2,f_3}{}^T$ represent the total current emitted by $A_0$, $A_1$, and $A_2$ flowing to $A_6$, respectively, when the balance of mode 1 operation is satisfied. The operation of mode 1 is balanced when the voltages of monitor electrodes $M_1$ and $M_2$ are equal or a voltage imbalance is removed by processing of signals to provide the focusing conditions. The relationship between the total currents in equation (4) and the measured current are:

$$I_{0,f_1}{}^T = I_{0,f_1}, \tag{5a}$$

$$I_{1,f_2}{}^T = C_{1,1} I_{1,f_2}, \tag{5b}$$

$$I_{2,f_3}{}^T = C_{1,2} I_{2,f_3}, \tag{5c}$$

where $C_{1,1}$ and $C_{1,2}$ are coefficients to be determined by processing the following equations.

$$\begin{bmatrix} \Delta VM_{1,2,f_2} & \Delta VM_{1,2,f_3} \\ I_{1,f_2} & I_{2,f_3} \end{bmatrix} \begin{bmatrix} C_{1,1} \\ C_{1,2} \end{bmatrix} = \begin{bmatrix} -\Delta VM_{1,2,f_1} \\ -I_{0,f_1} \end{bmatrix}. \tag{6}$$

The apparent resistivity of mode I can be computed by the following formula $$R_{a,Model} = k_1 \frac{UM_1}{I_0}, \tag{7a}$$

or $$R_{a,Model} = k_1 \frac{UM_2}{I_0}, \tag{7b}$$

where
$UM_1 = UM_{1,f_1} + C_{1,1}*UM_{1,f_2} + C_{1,2}*UM_{1,f_3}$,
$UM_2 = UM_{2,f_1} + C_{1,1}*UM_{2,f_2} + C_{1,2}*UM_{2,f_3}$,
$I_0 = I_{0,f_1}$, and $k_1$ is the tool's coefficient of mode 1. The total current emitted by $A_0$ and $A_1$ is labeled as $I_{model} = I_0 + I_{1,f_1}$, which can be used to compute the apparent resistivity for mode 2 to mode 5.

The voltage on $M_1$ to $M_{10}$ and voltage difference between $M_3$ and $M_4$, $M_5$ and M6, $M_7$ and $M_8$, and $M_9$ and $M_{10}$ for mode 1 can be expressed as:

$$UM_{i,Model1} = UM_{i,f_1} + C_{1,1}*UM_{i,f_2} + C_{1,2}*UM_{i,f_3}, \quad i=1,\ldots,10, \tag{8a}$$

$$\Delta VM_{j,j+1,Model1} = \Delta VM_{j,j+1,f_1} + C_{1,1}*\Delta VM_{j,j+1,f_2} + C_{1,2}*\Delta VM_{j,j+1,f_3}, \quad j=3,5,7,9, \tag{8b}$$

which can be used in the apparent resistivity computation from mode 2 to mode 5.

Figure 7A:
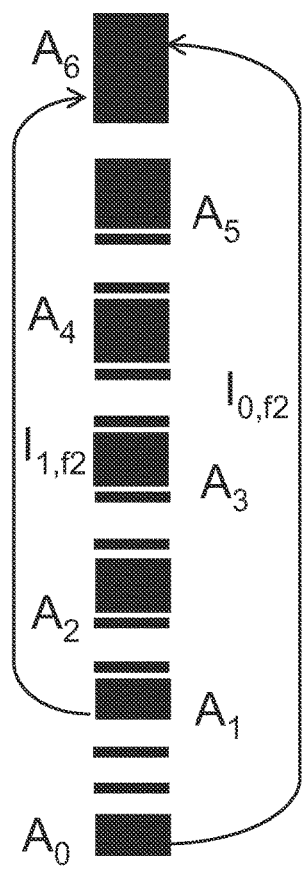
FIGS. 7A-7C show schematically three separated current flow patterns of mode 1, applicable for combined software and hardware focusing, in accordance with various embodiments.
Figure 7B:
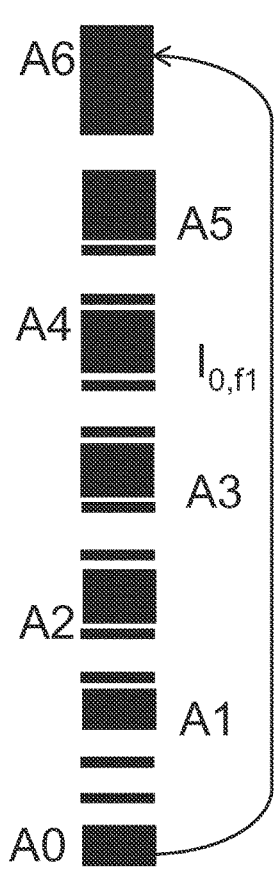
Figure 7C:
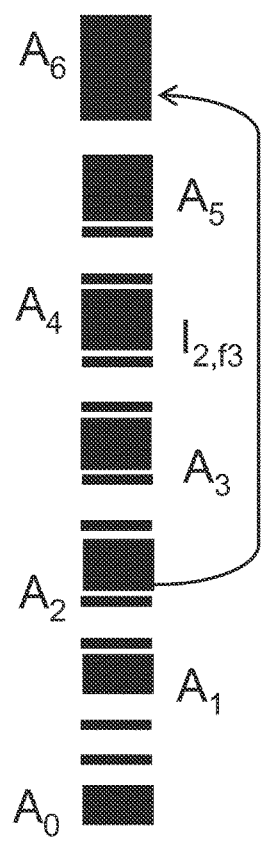

FIGS. 7A-C show schematically the three separated current flow patterns of mode i, applicable for combined software and hardware focusing in which a signal of differential voltage between $M_1$ and $M_2$ of frequency $f_2$ is readable. FIG. 7A represents hardware focusing, while FIGS. 7B and 7C represent the current emitted by $A_0$ and $A_2$ flowing to $A_6$, respectively. The operation of mode I can be realized by the following processing, $$I_{2,f_3} = -(I_0{}^T + I_{1,f_2}{}^T), \tag{9}$$

where $I_0{}^T$, $I_{1,f_2}{}^T$, and $I_{2,f_3}$ represent the total current emitted by $A_0$, $A_1$, and $A_2$ flowing to $A_6$, respectively, when the balance of mode 1 operation is satisfied. The relationship between the total currents in equation (9) and measured current are $$I_0{}^T = C_{1,1} I_{0,f_1} + I_{0,f_2}, \tag{10a}$$

$$I_{1,f_2}{}^T = I_{1,f_2}, \tag{10b}$$

$$I_{2,f_3}{}^T = C_{1,2} I_{2,f_3}, \tag{10c}$$

where $C_{1,1}$ and $C_{1,2}$ are coefficients determined from processing the following equations.

$$\begin{bmatrix} \Delta VM_{1,2,f_1} & \Delta VM_{1,2,f_3} \\ I_{0,f_1} & I_{2,f_3} \end{bmatrix} \begin{bmatrix} C_{1,1} \\ C_{1,2} \end{bmatrix} = \begin{bmatrix} -\Delta VM_{1,2,f_2} \\ -(I_{0,f_2} + I_{1,f_2}) \end{bmatrix}. \tag{11}$$

The following formula can be used to compute the apparent resistivity of mode 1 as:

$$R_{a,Model} = k_1 \frac{UM_1}{I_0}, \tag{12a}$$

or $$R_{a,Model} = k_1 \frac{UM_2}{I_0}, \tag{12b}$$

where
$UM_1 = UM_{1,f_2} + C_{1,1}*UM_{1,f_1} + C_{1,2}*UM_{1,f_3}$,
$UM_2 = UM_{2,f_2} + C_{1,1}*UM_{2,f_1} + C_{1,2}*UM_{2,f_3}$,
$I_0 = C_{1,1} I_{0,f_1} + I_{0,f_2}$, and $k_1$ is the tool's coefficient of mode 1. The total current emitted by $A_0$, $A_1$, and $A_1'$ is labelled as $$I_{model} = C_{1,1} I_{0,f_1} + I_{0,f_2} + I_{1,f_1},$$

which can be used to compute apparent resistivity for mode 2 to mode 5.

The voltage on $M_1$ through $M_{10}$ and voltage difference between $M_3$ and $M_4$, $M_5$ and $M_6$, $M_7$ and $M_8$, and $M_9$ and $M_{10}$ for mode 1 are expressed as:

$$UM_{i,Model1} = UM_{i,f2} + C_{1,1}*UM_{i,f1} + C_{1,2}*UM_{i,f3},$$
$$i=1,\ldots,10, \quad (13a)$$

$$\Delta VM_{j,j+1,Model1} = \Delta VM_{j,j+1,f2} + C_{1,1}*\Delta VM_{j,j+1,f1} + C_{1,2}*\Delta VM_{j,j+1,f3}, \; j=3,5,7,9, \quad (13b)$$

and can be used in the apparent resistivity computation from mode 2 to mode 5.

Figure 8A:
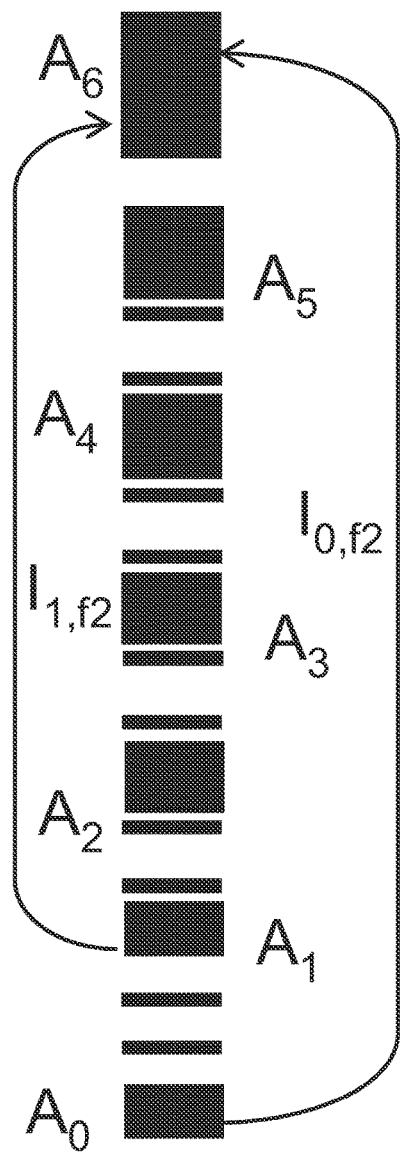
FIGS. 8A-8B show schematically the two separated current flow patterns of mode 1, applicable for combined software and hardware focusing in which a signal of differential voltage is not available for hardware focusing, in accordance with various embodiments.
Figure 8B:
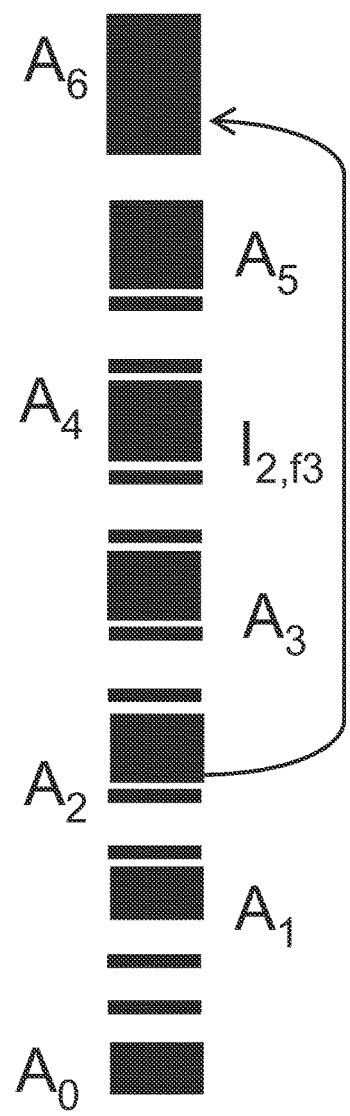

FIGS. 8A-B show schematically the two separated current flow patterns of mode 1, applicable for combined software and hardware focusing without in a signal of differential voltage between $M_1$ and $M_2$ ($\Delta V_{1,2}$ signal). In this method, signals of differential voltage between $M_1$ and $M_2$ are not readable for all frequencies. FIG. 8A represents hardware focusing, while FIG. 8B represents the current emitted by $A_2$ flowing to $A_6$. The operation of mode 1 can be realized by the following processing.

$$I_{2,f2}{}^T = -(I_{0,f1} + I_{1,f1}), \quad (14)$$

where $I_{0,f1}$ and $I_{1,f1}$ represent the current emitted by $A_0$, $A_1$ flowing to $A_6$, respectively, and $I_{2,f2}{}^T$ is the total current emitted by $A_2$ flowing into $A_6$. When the balance of mode 1 operation is satisfied, one has $$C_{1,1} = \frac{I_{2,f2}^T}{I_{2,f2}}. \quad (15)$$

The following formula can be used to compute the apparent resistivity of mode as:

$$R_{a,Model1} = k_1 \frac{UM_1}{I_0}, \quad (16a)$$

or $$R_{a,Model1} = k_1 \frac{UM_2}{I_0}, \quad (16b)$$

where
$UM_1 = UM_{1,f1} + C_{1,1}*UM_{1,f2}$,
$UM_2 = UM_{2,f1} + C_{1,1}*UM_{2,f2}$,
$I_0 = I_{0,f1}$, $k_1$ is the tool's coefficient of mode 1, when the voltage between monitor electrodes $M_1$ and $M_2$ is unreadable. The total current emitted by $A_0$ and $A_1$, labeled as $I_{model1} = I_{0,f1} + I_{1,f1}$, can be used to compute the apparent resistivity for mode 2 to mode 5.

The voltage on $M_1$ through $M_{10}$ and voltage difference between $M_3$ and $M_4$, $M_5$ and $M_6$, $M_7$ and M8, and $M_9$ and $M_{10}$ for mode 1 are expressed as:

$$UM_{i,Model1} = UM_{i,f1} + C_{1,1}*UM_{i,f2}, \; i=1,\ldots,10, \quad (17a)$$

$$\Delta VM_{j,j+1,Model1} = \Delta VM_{j,j+1,f1} + C_{1,1}*\Delta VM_{j,j+1,f2}, \; j=3,5,7,9, \quad (17b)$$

which can be used in the apparent resistivity computation from mode 2 to mode 5.

Figure 9C:
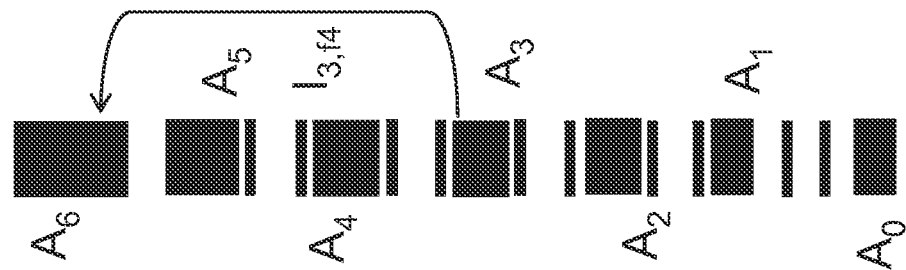
FIGS. 9A-9C show schematically three separated current flow patterns to form a current pattern of a mode 2, in accordance with various embodiments.
Figure 9B:
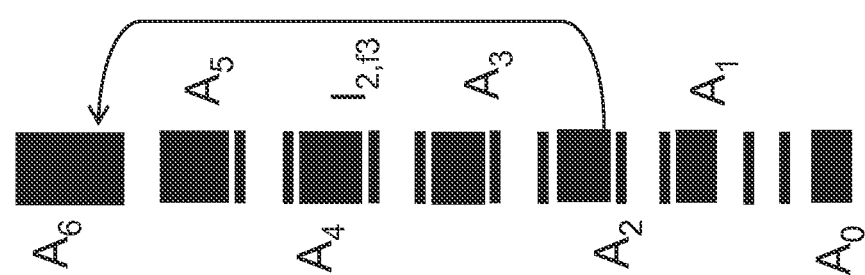
Figure 9A:
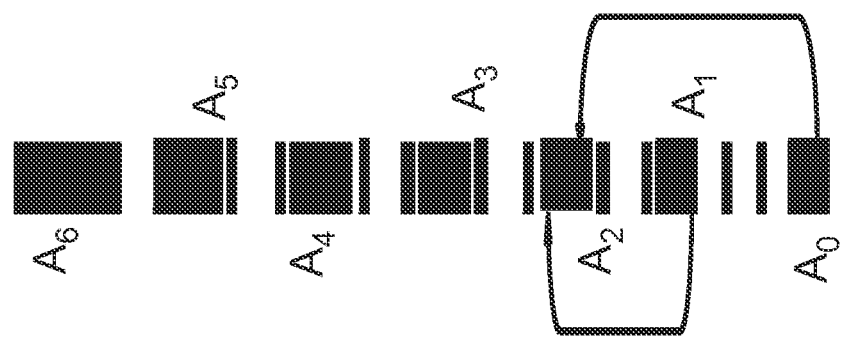

FIGS. 9A-C show schematically three separated current flow patterns to form a current pattern of mode 2. FIG. 9A represents a current flow pattern of mode 1, and FIGS. 8B and 8C represent the current emitted by $A_2$ and $A_3$ flowing to $A_6$, respectively. The operation of mode 2 can be realized by following processing, $$I_{3,f3}{}^T = -(I_{model1} + I_{2,f2}{}^T), \quad (18)$$

where $I_{model1}$, $I_{2,f2}$, and $I_{3,f3}$ represent the total current of mode 1 emitted by $A_0$, $A_1$, and $A_1'$ flowing to A2, and current emitted by $A_2$ and $A_3$ flowing to $A_6$, respectively, when the balance of mode 2 operation is satisfied.

The relationship between the total currents in equation (18) and the measured current are $$I_{2,f2}{}^T = C_{2,1} I_{2,f2}, \quad (19a)$$

$$I_{3,f3}{}^T = C_{2,2} I_{3,f3}, \quad (19b)$$

where $C_{2,1}$ and $C_{2,2}$ are coefficients to be determined by solving the following equations, $$\begin{bmatrix} \Delta VM_{3,4,f2} & \Delta VM_{3,4,f3} \\ I_{2,f3} & I_{3,f4} \end{bmatrix} \begin{bmatrix} C_{2,1} \\ C_{2,2} \end{bmatrix} = \begin{bmatrix} -\Delta VM_{3,4,model1} \\ -I_{model1} \end{bmatrix}. \quad (20)$$

The following formula can be used to compute the apparent resistivity of mode 2, $$R_{a,Mode2} = k_2 \frac{UM_1}{I_{model1}}, \quad (21a)$$

or $$R_{a,Mode2} = k_2 \frac{UM_2}{I_{model1}}, \quad (21b)$$

where
$UM_1 = UM_{1,model1} + C_{2,1}*UM_{1,f2} + C_{2,2}*UM_{1,f3}$,
$UM_2 = UM_{2,model1} + C_{2,1}*UM_{2,f2} + C_{2,2}*UM_{2,f3}$,
$k_2$ is the tool's coefficient of mode 2.

FIGS. 10A-D shows schematically four separated current flow patterns of mode 3. FIG. 10A represents current flow pattern of mode 1, while FIGS. 10B, 10C and 10D represent the current emitted by $A_2$, $A_3$, and $A_4$ flowing to $A_6$, respectively. The operation of mode 3 can be realized by following processing, $$I_{4,f4}{}^T = -(I_{model1} + I_{2,f2}{}^T + I_{3,f3}{}^T) \quad (22)$$

where $I_{model1}$, $I_{2,f2}{}^T$, $I_{3,f3}{}^T$, and $I_{4,f4}{}^T$ represent the total current of mode 1 emitted by $A_0$, $A_1$, and $A_1'$ flowing to A2, and current emitted by $A_2$, $A_3$, and $A_4$ flowing to $A_6$, respectively, when the balance of mode 3 operation is satisfied. The relationship between the total currents in equation (22) and measured current are $$I_{2,f2}{}^T = C_{3,1} I_{2,f2}, \quad (23a)$$

$$I_{3,f3}{}^T = C_{3,2} I_{3,f3}, \quad (23b)$$

$$I_{4,f4}{}^T = C_{3,3} I_{4,f4}, \quad (23c)$$

where $C_{3,1}$, $C_{3,2}$ and $C_{3,3}$ are coefficients to be determined by solving following the equations.

$$\begin{bmatrix} \Delta VM_{3,4,f2} & \Delta VM_{3,4,f3} & \Delta VM_{3,4,f4} \\ \Delta VM_{5,6,f2} & \Delta VM_{5,6,f3} & \Delta VM_{5,6,f4} \\ I_{2,f3} & I_{3,f4} & I_{4,f5} \end{bmatrix} \begin{bmatrix} C_{3,1} \\ C_{3,2} \\ C_{3,3} \end{bmatrix} = \begin{bmatrix} -\Delta VM_{3,4,model1} \\ -\Delta VM_{5,6,model1} \\ -I_{model1} \end{bmatrix}. \quad (24)$$

The apparent resistivity of mode 3 can be computed by the following formula.

$$R_{a,Mode3} = k_3 \frac{UM_1}{I_{model}} \quad (25a)$$

or $$R_{a,Mode3} = k_3 \frac{UM_2}{I_{model}} \quad (25b)$$

where $UM_1 = UM_{1,model} + C_{3,3}*UM_{1,f_2} + C_{3,2}*UM_{1,f_3} + C_{3,3}*UM_{1,f_4}$, $UM_2 = UM_{2,model} + C_{3,1}*UM_{2,f_2} + C_{3,2}*UM_{2,f_3} + C_{3,3}*UM_{2,f_4}$, and $k_3$ is the tool's coefficient of mode 3.

FIGS. 11A-E show schematically five separated current flow patterns of mode 4. FIG. 11A represents a current flow pattern of mode 1, while FIGS. 11B, 11C, 11D, and 11E represent the current emitted by $A_0$, $A_2$, $A_3$, $A_4$, and $A_5$ flowing to $A_6$, respectively. The operation of mode 4 can be realized by following processing, $$I_{5,f_5}{}^T = -(I_{model} + I_{2,f_2}{}^T + I_{3,f_3}{}^T + I_{4,f_4}{}^T) \quad (26)$$

where $I_{model}$, $I_{2,f_2}{}^T$, $I_{3,f_3}{}^T$, $I_{4,f_4}{}^T$, and $I_{5,f_5}{}^T$ represent the total current of mode 1 emitted by $A_0$. $A_1$, and $A_1'$ flowing to A2, and current emitted by $A_2$, $A_3$, $A_4$, and $A_5$ flowing to $A_6$, respectively, when the balance of mode 4 operation is satisfied. The relationship between the total currents in equation (26) and the measured current are $$I_{2,f_2}{}^T = C_{4,1} I_{2,f_2}, \quad (27a)$$

$$I_{3,f_3}{}^T = C_{4,2} I_{3,f_3}, \quad (27b)$$

$$I_{4,f_4}{}^T = C_{4,3} I_{4,f_4}, \quad (27c)$$

$$I_{5,f_5}{}^T = C_{4,4} I_{5,f_5}, \quad (27d)$$

where $C_{4,1}$, $C_{4,2}$, $C_{4,3}$, and $C_{4,4}$ are coefficients to be determined by solving the following equations, $$\begin{bmatrix} \Delta VM_{3,4,f_3} & \Delta VM_{3,4,f_4} & \Delta VM_{3,4,f_5} & \Delta VM_{3,4,f_6} \\ \Delta VM_{5,6,f_3} & \Delta VM_{5,6,f_4} & \Delta VM_{5,6,f_5} & \Delta VM_{5,6,f_6} \\ \Delta VM_{7,8,f_3} & \Delta VM_{7,8,f_4} & \Delta VM_{7,8,f_5} & \Delta VM_{7,8,f_6} \\ I_{2,f_2} & I_{3,f_3} & I_{4,f_4} & I_{5,f_5} \end{bmatrix} \begin{bmatrix} C_{4,1} \\ C_{4,2} \\ C_{4,3} \\ C_{4,4} \end{bmatrix} = \begin{bmatrix} -\Delta VM_{3,4,model} \\ -\Delta VM_{5,6,model} \\ -\Delta VM_{7,8,model} \\ -I_{model} \end{bmatrix}. \quad (28)$$

The apparent resistivity of mode 4 can be computed by the following formula, $$R_{a,Mode4} = k_4 \frac{UM_1}{I_{model}}, \quad (29a)$$

or $$R_{a,Mode4} = k_4 \frac{UM_2}{I_{model}}, \quad (29b)$$

where $UM_1 = UM_{1,model} + C_{4,1}*UM_{2,f_2} + C_{4,2}*UM_{1,f_3} + C_{4,3}*UM_{1,f_4} + C_{4,4}*UM_{1,f_5}$, $UM_2 = UM_{2,model} + C_{4,1}*UM_{2,f_2} + C_{4,2}*UM_{2,f_3} + C_{4,3}*UM_{2,f_4} + C_{4,4}*UM_{2,f_5}$, and $k_4$ is the tool's coefficient of mode 4.

Mode 5 of operation can be realized by combining the measurements of FIGS. 11A-E using a set of constraints. The apparent resistivity of mode 5 can be computed by the following formula, $$R_{a,Mode5} = k_5 \frac{UM_1}{I_{model}}, \quad (30a)$$

or $$R_{a,Mode5} = k_5 \frac{UM_2}{I_{model}}, \quad (30b)$$

where $UM_1 = UM_{1,model} + C_{5,1}*UM_{1,f_2} + C_{5,2}*UM_{1,f_3} + C_{5,3}*UM_{1,f_4} + C_{5,4}*UM_{1,f_5}$, $UM_2 = UM_{2,model} + C_{5,1}*UM_{2,f_2} + C_{5,2}*UM_{2,f_3} + C_{5,3}*UM_{2,f_4} + C_{5,4}*UM_{2,f_5}$, and $k_s$ is the tool's coefficient of mode 5. In addition, the coefficients, $C_{5,1}$, $C_{5,2}$, $C_{5,3}$, and $C_{5,4}$ can be computed by the following equations.

$$\begin{bmatrix} \Delta VM_{3,4,f_2} & \Delta VM_{3,4,f_3} & \Delta VM_{3,4,f_4} & \Delta VM_{3,4,f_5} \\ \Delta VM_{5,6,f_2} & \Delta VM_{5,6,f_3} & \Delta VM_{5,6,f_4} & \Delta VM_{5,6,f_5} \\ \Delta VM_{7,8,f_2} & \Delta VM_{7,8,f_3} & \Delta VM_{7,8,f_4} & \Delta VM_{7,8,f_5} \\ \Delta VM_{9,10,f_2} & \Delta VM_{9,10,f_3} & \Delta VM_{9,10,f_4} & \Delta VM_{9,10,f_5} \end{bmatrix} \begin{bmatrix} C_{5,1} \\ C_{5,2} \\ C_{5,3} \\ C_{5,4} \\ C_{5,4} \end{bmatrix} = \begin{bmatrix} -\Delta VM_{3,4,model} \\ -\Delta VM_{5,6,model} \\ -\Delta VM_{7,8,model} \\ -\Delta VM_{9,10,model} \end{bmatrix}. \quad (31)$$

The methodology expressed above can be used to compute the apparent resistivity of an array laterolog tool when more signals are unreadable.

Figure 12:
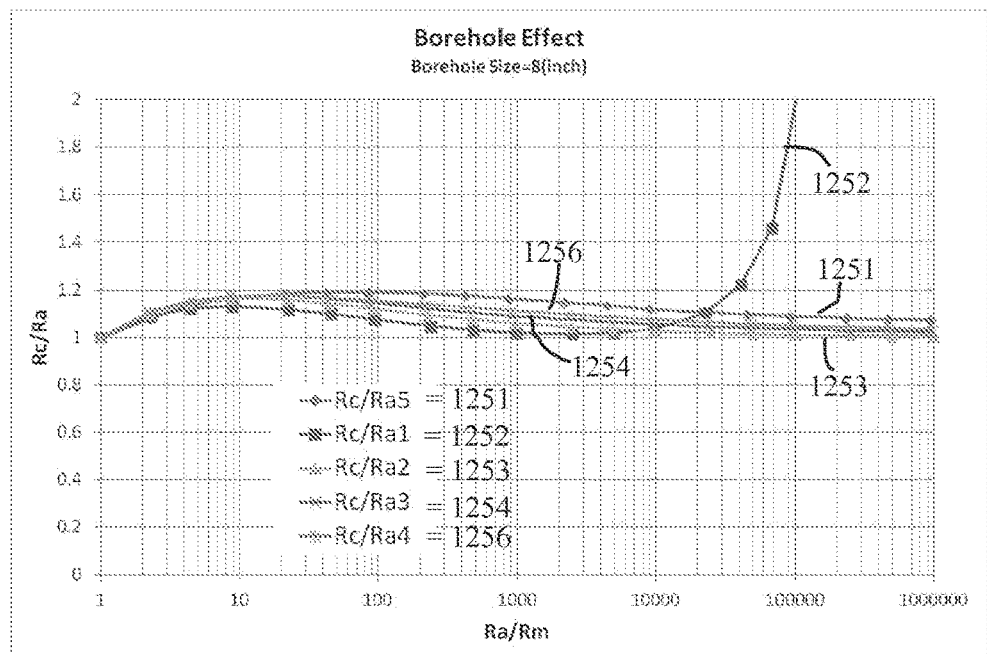
FIG. 12 shows curves demonstrating the borehole effect on apparent resistivity of array laterolog tool when all signals are measurable, in accordance with various embodiments.
Figure 13:
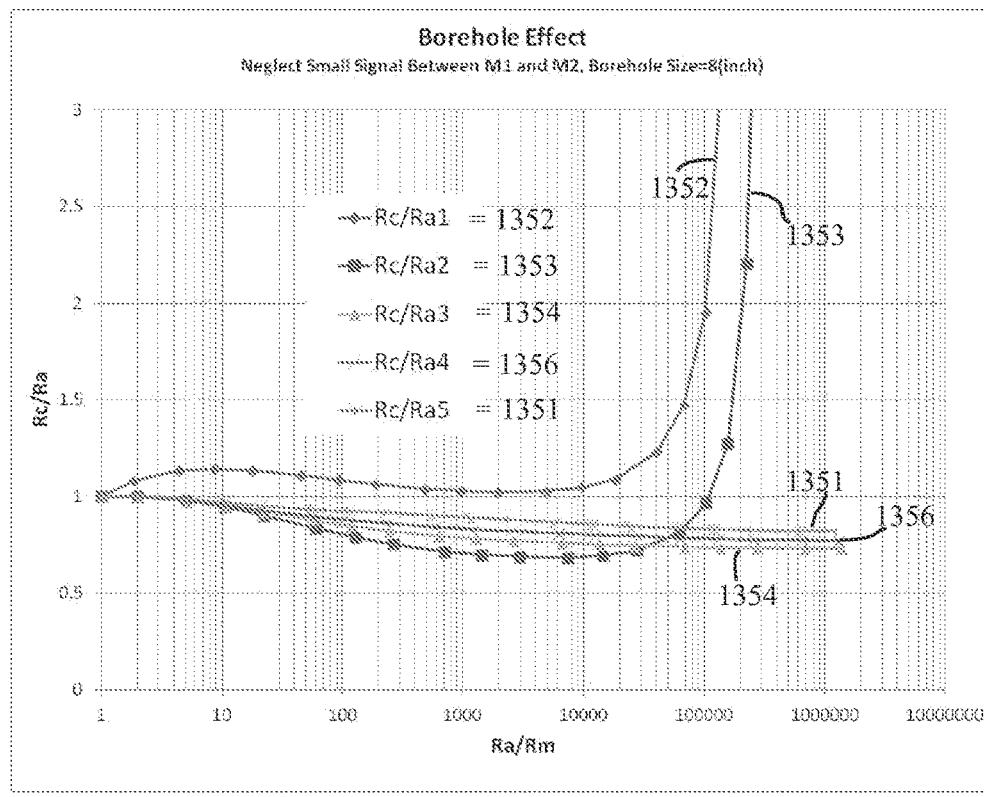
FIG. 13 shows curves demonstrating the borehole effect on apparent resistivity of array laterolog tool when some signals between a pair of monitor electrodes are unreadable, in accordance with various embodiments.

FIG. 12 shows curves demonstrating the borehole effect on apparent resistivity of array laterolog tool when all signals are measurable. FIG. 13 shows curves demonstrating the borehole effect on apparent resistivity of array laterolog tool when some signals between $M_1$ and $M_2$ are unreadable such as when the measured data is like that shown in Table 2. Both figures show a plot of the ratio of corrected resistance to apparent resistance as a function of the ratio of the apparent resistance to mud resistance. In curves 1251 and 1351, the apparent resistance is the apparent resistance from mode 5. In curves 1252 and 1352, the apparent resistance is the apparent resistance from mode 1. In curves 1253 and 1353, the apparent resistance is the apparent resistance from mode 2. In curves 1254 and 1354, the apparent resistance is the apparent resistance from mode 3. In curves 1256 and 1356, the apparent resistance is the apparent resistance from mode 4. Comparison of FIGS. 12 and 13 indicates that different look up tables are to be used to perform borehole correction when some signals are not readable.

In various embodiments, a software focusing methodology as described herein can be used to compute apparent resistivity of array laterolog tool when some signals are too small to be measured. Such processing may offer more stable array laterolog measurements that may offer more accurate and stable apparent formation resistivity, in high contrast cases between formation resistivity and mud resistivity.

FIG. 14 shows features of an embodiment of an example method of using a tool to determine resistivity of a formation around a borehole. At 1410, current from a main electrode of a tool disposed in a borehole is generated. The current from the main electrode can be generated at an assigned frequency. The tool can have a number of current electrodes spaced apart from each other in a sequence from the main electrode and can have two monitor electrodes between the main electrode and a first current electrode of the sequence and two monitor electrodes located next to each other between each of two adjoining current electrodes in the sequence. The current can be generated as a current from the main electrode to the last current electrode in the sequence. The tool can include additional current electrodes and monitor electrodes arranged in a sequence from the main electrode in a manner similar to or identical to the above-mentioned sequence but in an opposite direction from the main electrode. The two sequences of current electrodes and monitor electrodes can be arranged symmetrically with each other relative to the main electrode.

At 1420, current from each one of the current electrodes in the sequence is generated to the last current electrode in the sequence at a frequency assigned to the current electrode. The assigned frequencies can be different from each other. The current generated from the main electrode and current electrodes can be generated such that theses currents only flow into the last current electrode. In an embodiment, an additional current can be generated from the main electrode to the last current electrode with the two monitor electrodes between the main electrode and the first current electrode physically set to substantially the same voltage, where the additional current can be at a frequency different from the frequency of the current from the main electrode. The frequency of the additional current can be set at the assigned frequency of the first current electrode.

At 1430, voltages at the monitor electrodes are determined in response to the currents generated from the current electrodes in the sequence. At 1440, voltage differences between two monitor electrodes located next to each other between each of two adjoining current electrodes in the sequence is determined in response to the currents generated. The voltage differences between two monitor electrodes located between the main electrode and the first current electrode can be determined. The voltage differences at the different frequencies can be measured directly using electronic circuitry of a control unit, a data processing unit, or a combination of a control unit and data processing unit. Alternatively, differences between the voltages measured at the monitor voltages can be determined, where the voltages at the monitor voltages are measured with respect to a reference. Filtering can be used to distinguish the frequency components.

Voltage $UM_i(t)$ at each monitor electrode $M_i$, $i=1, 2, 3, \ldots, 2*(N-1)$ can be measured, and voltage differences $\Delta VM_{i,i+1}(t)$ between monitoring electrode located next to each other between two adjoining current electrodes can be measured. With all currents being injected into the formation simultaneously, the measured quantities $UM_i(t)$ and $\Delta VM_{i,i+1}(t)$ can be represented as a sum of components by superposition, with each component representing a single frequency. By superposition, the following relationships can be formed $$UM_i(t) = \sum_{k=0}^{N-1} UM_{i,f_k} \cos(2\pi f_k t + \phi_{i,k}), i = 1, 2, 3, \ldots, 2*(N-1)$$

and $$\Delta VM_{i,i+1}(t) = \sum_{k=0}^{N-1} \Delta VM_{i,i+1,f_k} \cos(2\pi f_k t + \phi_{i,i+1,k}),$$

$$i = 1, 3, 5, \ldots, 2*(N-1) - 1,$$

where N is the number of current electrodes in the sequence, k=0 refers to the main electrode and k=1 . . . N−1 refers to the current electrodes in the sequence except the last electrode, $UM_{i,f_k}$ is an amplitude of the voltage with frequency $f_k$ at the $i^{th}$ monitoring electrode, t is measuring time for each logging position, $\phi_{i,k}$ is initial phase with respect to frequency $f_k$ on the $i^{th}$ monitor, $\Delta VM_{i,i+1,f_k}$ is an amplitude of the voltage with frequency $f_k$ between $i^{th}$ and $(i+1)^{th}$ monitor electrodes, and $\phi_{i,i+1,k}$ is the initial phase of $\Delta VM_{i,i+1,f_k}$ with frequency $f_k$. The relationships can be processed, for example using one or processors and data storage devices, determining each $UM_{i,f_k}$, $\phi_{i,k}$, $\Delta VM_{i,i+1,f_k}$, and $\phi_{i,i+1,k}$. The measuring time t can be discrete. Processing can include using a fast Fourier transform or a least-square method on data and relationships corresponding to the discrete times.

The currents, $I_{k,f_k}$, emitted by the main electrode and the current electrodes, other than the last electrode, can be recorded as $I_{0,f_0}$, $I_{1,f_1}$, . . . , $I_{(N-1),f_{N-1}}$ in a memory device. Processing can include balancing the two monitor electrodes between the main electrode and a first current electrode such that voltage imbalance is removed by processing of signals to provide a focusing condition. In an embodiment, with $I_{0,f_1}$ being an additional current generated from the main electrode to the last current electrode with the two monitor electrodes between the main electrode and the first current electrode physically set to substantially the same voltage, currents emitted by the main electrode and the current electrodes, other than the last electrode, can be recorded as $I_{0,f_0}$, $I_{0,f_1}$, $I_{1,f_1}$, . . . , $I_{(N-1),f_{N-1}}$ in a memory device. The additional current can be at the frequency of the current from the first current electrode. At 1450, an apparent resistivity based on the determined voltages and the determined voltage differences is determined.

FIG. 15 shows features of an embodiment of an example method of using a tool to determine resistivity of a formation around a borehole. At 1510, a tool disposed in a borehole is operated according to a plurality of modes. Each mode can correspond to a current pattern emitted from the tool. The tool can have a number of current electrodes spaced apart from each other in a first sequence from a main electrode and a number of current electrodes spaced apart from each other in a second sequence from the main electrode, two monitor electrodes between the main electrode and a first current electrode of the first sequence, two monitor electrodes between the main electrode and a first current electrode of the second sequence, and two monitor electrodes located next to each other between each of two adjoining current electrodes in the first sequence and in the second sequence. For each mode, the two monitor electrodes between the main electrode and the first current electrode of the first sequence can be set to equal voltages by processing signals to provide focusing conditions of the respective mode, and the two monitor electrodes between selected current electrodes of the first sequence with respect to the respective mode can be set to equal voltages by processing signals to provide focusing conditions of the respective mode, using linearity of measuring environment to determine the quantities being measured from known relationships between current and potential in the measuring environment (software processing). In an embodiment, the two monitor electrodes between the main electrode and the first current electrode of the first sequence or the two monitor electrodes between selected adjoining current electrodes of the first sequence can be set to equal voltages by adjusting one or more currents flowing from the tool. The two monitor electrodes between the main electrode and the first current electrode of the first sequence can be set to equal voltages by the adjustment. This setting of balance among selected monitor electrodes can be conducted as hardware processing or a combination of hardware and software processing.

At 1520, voltages measured from monitor electrodes of the first sequence, readable voltage differences measured between the two monitor electrodes between the two adjoining current electrodes of the first sequence, and measured currents at a plurality of frequencies are processed according to each mode. The electrodes of the first sequence and the electrodes of the second sequence may be operated in a similar or an identical manner. With not all voltage differences readable, an approach to focusing an array laterolog can include using a survey current from the main electrode and an effective survey current taken as a sum of the current from the main electrode and one or more current electrodes. In an embodiment, the current emitted from the main electrode of the first mode can be emitted at a first frequency and the total current emitted from the main electrode, the first current electrode of the first sequence, and the first current electrode of the second sequence can be used as a first mode current equal to the sum of the current emitted from the main electrode at the first frequency and current from the first current electrodes of the first and second sequences at the first frequency. For each mode, the first mode current can be used to determine coefficients that relate total voltages at the two monitor electrodes between the main electrode and the first current electrode of the first sequence to voltages at the two monitor electrodes between the main electrode and the first current electrode of the first sequence at the frequencies of the respective mode.

The processing can be conducted such that an apparent resistivity of a first mode of the plurality of modes can be processed as being inversely proportional to a current emitted from the main electrode and an apparent resistivity for each of the other modes can be processed as being inversely proportional to a total current including total current emitted from the main electrode, the first current electrode of the first sequence, and the first current electrode of the second sequence. In some embodiments, the total current can include current from other components in addition to the total current emitted from the main electrode, the first current electrode of the first sequence, and the first current electrode of the second sequence.

A tool such as one used in methods associated with FIG. 14 or FIG. 15 can be directed to operation by an electronic system using instructions physically stored in device. A machine-readable storage device can have instructions stored thereon, which, when performed by a machine, cause the machine to perform operations, where the operations comprises features similar or identical to those discussed with respect to FIGS. 14 and 15. With respect to features similar or identical to those discussed with respect to FIGS. 14 and 15, a system can be structured such that its operations include features similar or identical to those discussed with respect to FIGS. 14 and 15. Such a system can comprise a tool operable in a borehole, the tool having a number of current electrodes spaced apart from each other in a sequence from a main electrode, the tool having two monitor electrodes between the main electrode and a first current electrode of the sequence and two monitor electrodes located next to each other between each of two adjoining current electrodes in the sequence; a control unit coupled to the tool, the control unit having circuitry to control generation of currents from the tool according to a plurality of modes, each mode corresponding to a current pattern emitted from the tool; and a processing unit coupled to the tool. The control unit and the processing unit can be arranged as an integrated unit.

Various components of a system including a tool having a main electrode; having a first number of electrodes to one side of the main electrode along the axis and a second number of electrodes on another side of the main electrode along the axis; and having a number of monitor electrodes to monitor signals with respect to current generated from the main electrode, the first number of electrodes, and the second number of electrodes, as described herein or in a similar manner, may be realized in combinations of hardware and software based implementations. These implementations may include a machine-readable storage device having machine-executable instructions, such as a computer-readable storage device having computer-executable instructions, to generate current from a main electrode of a tool disposed in a borehole at a frequency assigned to the main electrode, the tool having a number of current electrodes spaced apart from each other in a sequence from the main electrode, the tool having two monitor electrodes between the main electrode and a first current electrode of the sequence and two monitor electrodes located next to each other between each of two adjoining current electrodes in the sequence; to generate current from each one of the current electrodes in the sequence to a last current electrode in the sequence at a frequency assigned to the current electrode, the assigned frequencies being different from each other; to determine voltages at the monitor electrodes in response to the currents generated from the current electrodes in the sequence; to determine voltage differences between the two monitor electrodes located next to each other between each of two adjoining current electrodes in the sequence in response to the currents generated; and to determine an apparent resistivity based on the determined voltages and the determined voltage differences.

In addition or in the alternative, these implementations may include a machine-readable storage device having machine-executable instructions, such as a computer-readable storage device having computer-executable instructions, to operate a tool disposed in a borehole according to a plurality of modes, each mode corresponding to a current pattern emitted from the tool, the tool having a number of current electrodes spaced apart from each other in a first sequence from a main electrode and a number of current electrodes spaced apart from each other in a second sequence from the main electrode, the tool having two monitor electrodes between the main electrode and a first current electrode of the first sequence, two monitor electrodes between the main electrode and a first current electrode of the second sequence, and two monitor electrodes located next to each other between each of two adjoining current electrodes in the first sequence and in the second sequence: and to process voltages measured from the monitor electrodes of the first sequence, readable voltage differences measured between the two monitor electrodes between the two adjoining current electrodes of the first sequence, and measured currents at a plurality of frequencies according to each mode such that an apparent resistivity of a first mode of the plurality of modes is processed as being inversely proportional to a current emitted from the main electrode and an apparent resistivity for each of the other modes is processed as being inversely proportional to a total current including total current emitted from the main electrode, the first current electrode of the first sequence, and the first current electrode of the second sequence. The instructions can include instructions to operate the first sequence and second sequence in a similar or an identical manner. The instructions can include instructions to manage the tool, determine formation resistivities, and direct drilling operations, such as but not limited to steering operations, based on the results of using the determined resistivities, in accordance with the teachings herein. Further, a machine-readable storage device, herein, is a physical device that stores data represented by physical structure within the device. Examples of machine-readable storage devices include, but are not limited to, read only memory (ROM), random access memory (RAM), a magnetic disk storage device, an optical storage device, a flash memory, and other electronic, magnetic, and/or optical memory devices.

Figure 16:
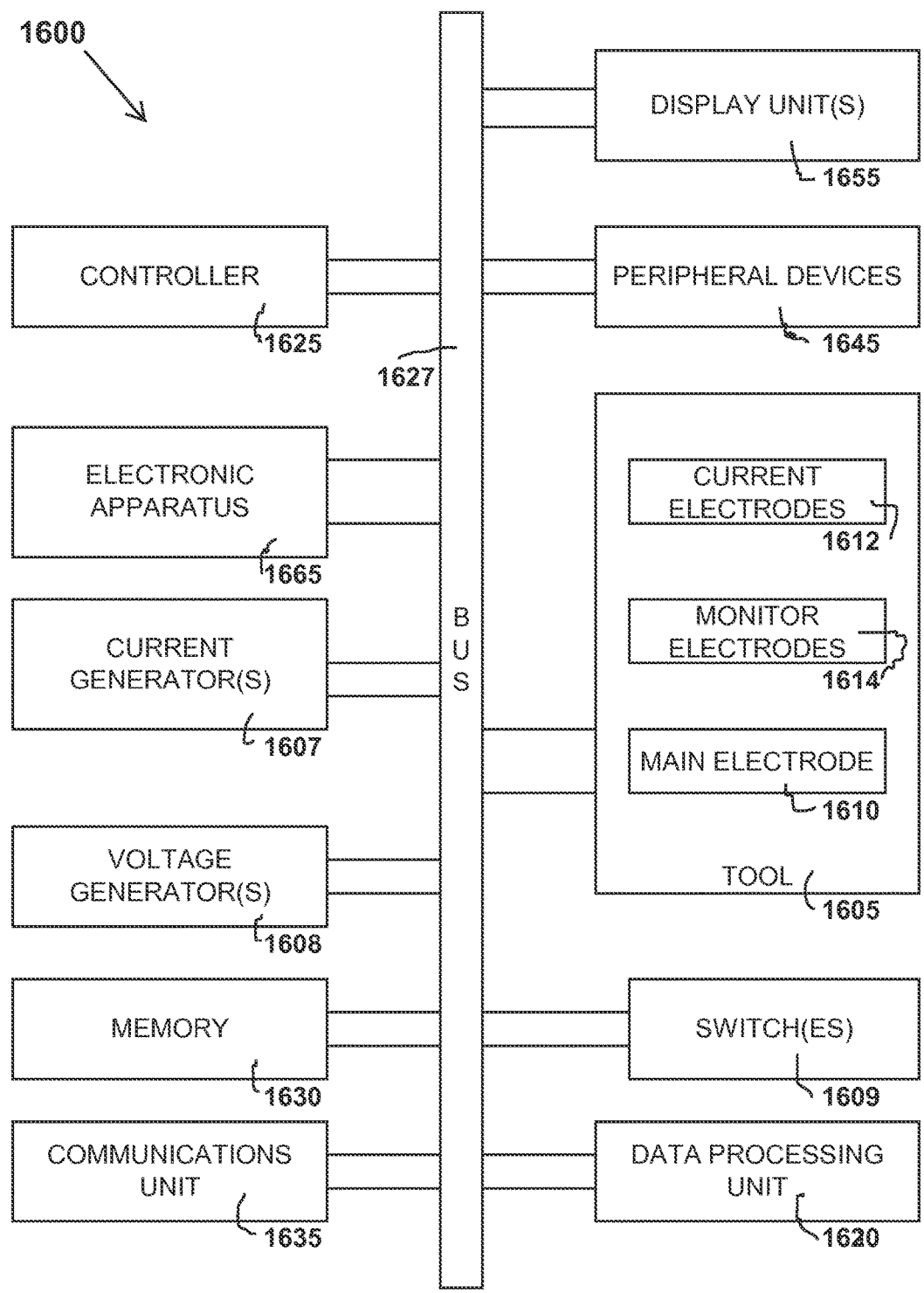
FIG. 16 depicts a block diagram of features of an example system having a tool configured with a main electrode operable with current electrodes and monitor electrodes arranged on the tool with respect to the main electrode, in accordance with various embodiments.

FIG. 16 depicts a block diagram of features of an example embodiment of a system 1600 having a tool 1605 including a main electrode 1610 operable with electrodes 1612 and 1614 arranged on the tool 1605 with respect to the main electrode 1610 along a longitudinal axis of the tool 1605. The system 1600 includes the tool 1605 having an arrangement of a main electrode 1610, current electrodes 1612, and monitor electrodes 1614 that can be realized in a similar or identical manner to arrangements of electrodes discussed herein. The system 1600 can be configured to operate in accordance with the teachings herein.

The system 1600 can include a controller 1625, a memory 1630, an electronic apparatus 1665, and a communications unit 1635. The controller 1625, the memory 1630, and the communications unit 1635 can be arranged to operate as a processing unit to control operation of the tool 1605, having an arrangement of the main electrode 1610, the current electrodes 1612, and the monitor electrodes 1614 to perform measurements in a borehole from which formation resistivity can be determined and management of a drilling operation can be conducted, in a manner similar or identical to the procedures discussed herein. Such a processing unit can be realized using a data processing unit 1620, which can be implemented as a single unit or distributed among the components of the system 1600 including the electronic apparatus 1665. The controller 1625 and the memory 1630 can operate to control activation of the main electrode 1610 and the current electrodes 1612 and selection of the monitor electrodes 1614 in the tool 1605 and to manage processing schemes in accordance with measurement procedures and signal processing as described herein. Generation of current between the main electrode 1610 and the current electrodes 1612 can be conducted using current generator(s) 1607. The current generator(s) 1607 can provide a reference current of the main electrode 1610. The current from the main electrode 1610 and selected ones of the current electrodes 1612 may depend on the current path and homogeneity status of the formation material of the current path. Selection of particular current electrodes and focusing of current to selected current electrodes may be realized using voltage generator(s) 1608 and switch(es) 1609 in addition to the current generator(s) 1607. The system 1600 can be structured to function in a manner similar to or identical to structures associated with FIGS. 1-13.

The communications unit 1635 can include downhole communications for appropriately located electrodes. Such downhole communications can include a telemetry system. The communications unit 1635 may use combinations of wired communication technologies and wireless technologies at frequencies that do not interfere with on-going measurements.

The system 1600 can also include a bus 1627, where the bus 1627 provides electrical conductivity among the components of the system 1600. The bus 1627 can include an address bus, a data bus, and a control bus, each independently configured or in an integrated format. The bus 1627 can be realized using a number of different communication mediums that allows for the distribution of components of the system 1600. Use of the bus 1627 can be regulated by the controller 1625.

In various embodiments, the peripheral devices 1645 can include additional storage memory and/or other control devices that may operate in conjunction with the controller 1625 and/or the memory 1630. In an embodiment, the controller 1625 can be realized as a processor or a group of processors that may operate independently depending on an assigned function. The peripheral devices 1645 can be arranged with one or more displays 1655, as a distributed component on the surface, that can be used with instructions stored in the memory 1630 to implement a user interface to monitor the operation of the tool 1605 and/or components distributed within the system 1600. The user interface can be used to input operating parameter values such that the system 1600 can operate autonomously substantially without user intervention.

Figure 17:
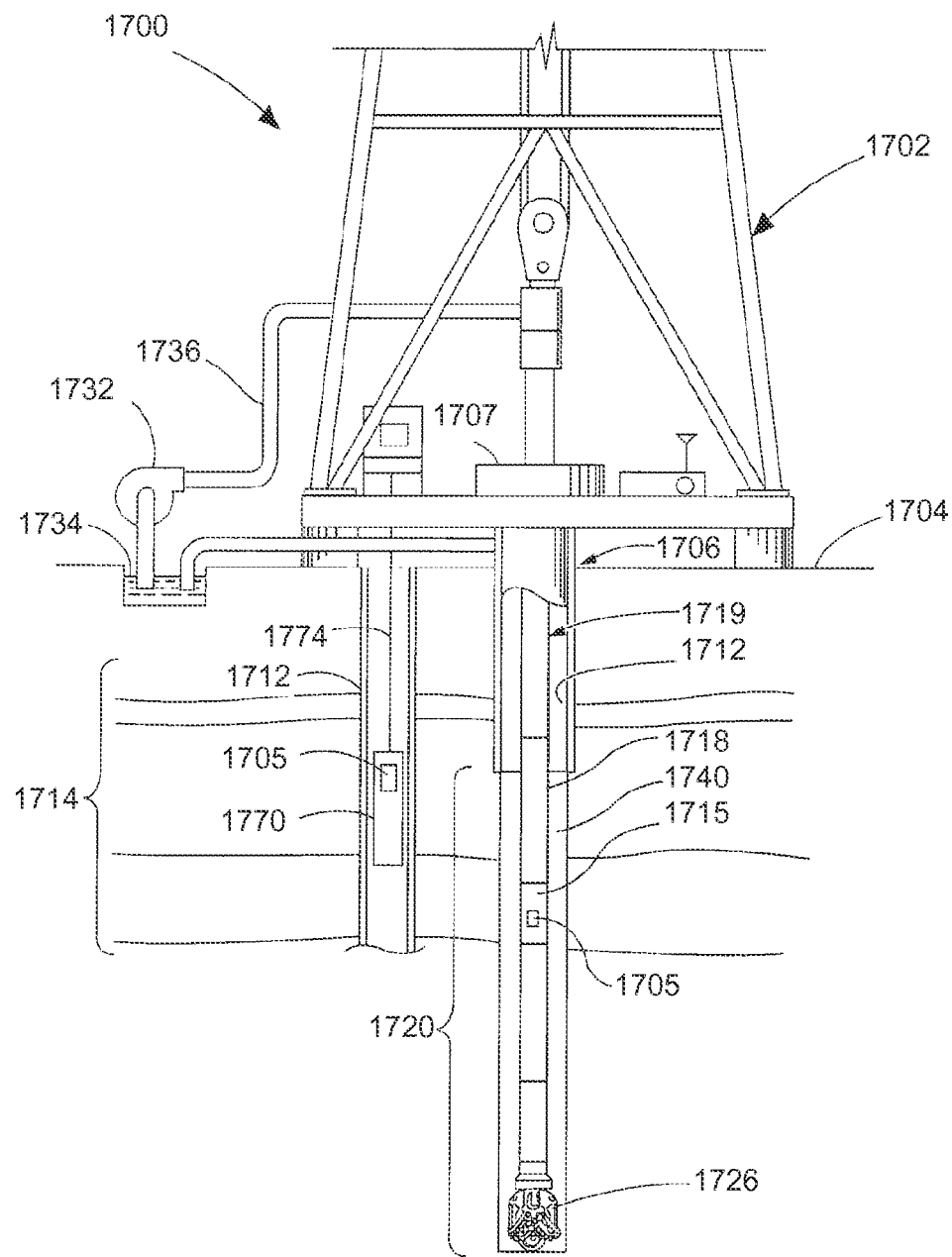
FIG. 17 depicts an example system at a drilling site, where the system includes a tool configured with a main electrode operable with current electrodes and monitor electrodes arranged on the tool with respect to the main electrode, in accordance with various embodiments.

FIG. 17 depicts an embodiment of a system 1700 at a drilling site, where the system 1700 includes a tool 1705 configured with a main electrode operable with electrodes arranged on the tool with respect to the main electrode along a longitudinal axis of the tool 1705. The tool 1705 can be realized in a similar or identical manner to arrangements of electrodes discussed herein and can be configured to operate in accordance with the teachings herein.

Generation and control of current from the main electrode and spaced apart electrodes on each side of the main electrode can provide for focused measurements. The system 1700 can be arranged in a land based drilling operation or a subsea drilling operation.

The system 1700 can include a drilling rig 1702 located at a surface 1704 of a well 1706 and a string of drill pipes, that is, the drill string 1708, connected together so as to form a drilling string that is lowered through a rotary table 1707 into a wellbore or borehole 1712. The drilling rig 1702 can provide support for the drill string 1708. The drill string 1708 can operate to penetrate rotary table 1707 for drilling a borehole 1712 through subsurface formations 1714. The drill string 1708 can include drill pipe 1718 and a bottom hole assembly 1720 located at the lower portion of the drill pipe 1718.

The bottom hole assembly 1720 can include drill collar 1715, the tool 1705 attached to the drill collar 1715, and a drill bit 1726. The drill bit 1726 can operate to create the borehole 1712 by penetrating the surface 1704 and the subsurface formations 1714. The tool 1705 can be structured for an implementation in the borehole 1712 of a well as a measurements-while-drilling (MWD) system such as a logging-while-drilling (LWD) system to determine formation resistivity, which can be used to direct drilling operations based on the determined resistivity. The housing containing the tool 1705 can include electronics to activate electrodes of the tool 1705 and collect responses from electrodes of the tool 1705. Such electronics can include a data processing unit to analyze signals received by the tool 1705 and provide measurement results of resistivity to the surface over a standard communication mechanism for operating a well. Alternatively, electronics can include a communications interface to provide signals measured by the tool 1705 to the surface over a standard communication mechanism for operating a well, where these measured signals can be analyzed at a processing unit at the surface.

During drilling operations, the drill string 1708 can be rotated by the rotary table 1707. In addition to, or alternatively, the bottom hole assembly 1720 can also be rotated by a motor (e.g., a mud motor) that is located downhole. The drill collars 1715 can be used to add weight to the drill bit 1726. The drill collars 1715 also can stiffen the bottom hole assembly 1720 to allow the bottom hole assembly 1720 to transfer the added weight to the drill bit 1726, and in turn, assist the drill bit 1726 in penetrating the surface 1704 and subsurface formations 1714.

During drilling operations, a mud pump 1732 can pump drilling fluid (sometimes known by those of skill in the art as "drilling mud") from a mud pit 1734 through a hose 1736 into the drill pipe 1718 and down to the drill bit 1726. The drilling fluid can flow out from the drill bit 1726 and be returned to the surface 1704 through an annular area 1740 between the drill pipe 1718 and the sides of the borehole 1712. The drilling fluid may then be returned to the mud pit 1734, where such fluid is filtered. In some embodiments, the drilling fluid can be used to cool the drill bit 1726, as well as to provide lubrication for the drill bit 1726 during drilling operations. Additionally, the drilling fluid may be used to remove the subsurface formation 1714 cuttings created by operating the drill bit 1726.

In various embodiments, the tool 1705 may be included in a tool body 1770 coupled to a logging cable 1774 such as, for example, for wireline applications. The tool body 1770 containing the tool 1705 can include electronics to activate electrodes of the tool 1705 and collect responses from electrodes of the tool 1705. Such electronics can include a data processing unit to analyze signals measured by the tool 1705 and provide measurement results of resistivity to the surface over a standard communication mechanism for operating a well. Alternatively, electronics can include a communications interface to provide signals measured by the tool 1705 to the surface over a standard communication mechanism for operating a well, where these collected measurement signals are analyzed at a processing unit at the surface. The logging cable 1774 may be realized as a wireline (multiple power and communication lines), a mono-cable (a single conductor), and/or a slick-line (no conductors for power or communications), or other appropriate structure for use in the bore hole 1712. Although not shown, the tool body 1770 can be used in the same borehole 1712 as the bottom hole assembly 1720.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

What is claimed is:

1. A method comprising:
   generating current from a main electrode of a tool disposed in a borehole at a frequency assigned to the main electrode, the tool having a number of current electrodes spaced apart from each other in a sequence from the main electrode, the tool having two monitor electrodes between the main electrode and a first current electrode of the sequence and two monitor electrodes located next to each other between each of two adjoining current electrodes in the sequence;
   generating current from each one of the current electrodes in the sequence to a last current electrode in the sequence at a frequency assigned to the current electrode, the assigned frequencies being different from each other;
   determining voltages at the monitor electrodes in response to the currents generated from the current electrodes in the sequence;
   determining voltage differences between the two monitor electrodes located next to each other between each of two adjoining current electrodes in the sequence in response to the currents generated; and
   determining an apparent resistivity based on the determined voltages and the determined voltage differences.

2. The method of claim 1, wherein an additional current is generated from the main electrode to the last current electrode with the two monitor electrodes between the main electrode and the first current electrode physically set to substantially the same voltage, the additional current at a frequency different from the assigned frequency of the current from the main electrode.

3. The method of claim 2, wherein the frequency of the additional current is set at the assigned frequency of the first current electrode.

4. The method of claim 1, wherein the method includes:
   measuring voltage $UM_i(t)$ at each monitor electrode $M_i$, $i=1, 2, 3, \ldots, 2*(N-1)$, and measuring voltage differences $\Delta VM_{i,i+1}(t)$ between monitoring electrode located next to each other between two adjoining current electrodes and by superposition forming the relationships given by $$UM_i(t) = \sum_{k=0}^{N-1} UM_{i,f_k} \cos(2\pi f_k t + \phi_{i,k}), i = 1, 2, 3, \ldots, 2*(N-1)$$

and $$\Delta VM_{i,i+1}(t) = \sum_{k=0}^{N-1} \Delta VM_{i,i+1,f_k} \cos(2\pi f_k t + \phi_{i,i+1,k}),$$

$$i = 1, 3, 5, \ldots, 2*(N-1)-1,$$

where N is the number of current electrodes in the sequence, k=0 refers to the main electrode and k=1 . . . N−1 refers to the current electrodes in the sequence except the last electrode, $UM_{i,f_k}$ is an amplitude of the voltage with frequency $f_k$ at the $i^{th}$ monitoring electrode, t is measuring time for each logging position, $\phi_{i,k}$ is initial phase with respect to frequency $f_k$ on the $i^{th}$ monitor, $\Delta VM_{i,i+1,f_k}$ is an amplitude of the voltage with frequency $f_k$ between $i^{th}$ and $(i+1)^{th}$ monitor electrodes, and $\phi_{i,i+1,k}$ is the initial phase of $\Delta VM_{i,i+,f_k}$ with frequency $f_k$; and
   processing the relationships, determining each $UM_{i,f_k}$, $\phi_{i,k}$, $\Delta VM_{i,i+1,f_k}$, and $\phi_{i,i+1,k}$.

5. The method of claim 4, wherein currents, $I_{k,f_k}$, emitted by the main electrode and the current electrodes, other than the last electrode, are recorded as $I_{0,f_0}, I_{1,f_1}, \ldots, I_{(N-1),f_{N-1}}$ in a memory device, or as $I_{0,f_0}, I_{0,f_1}, I_{1,f_1}, \ldots, I_{(N-1),f_{N-1}}$ with $I_{0,f_1}$ being an additional current generated from the main electrode to the last current electrode with the two monitor electrodes between the main electrode and the first current electrode physically set to substantially the same voltage, the additional current at the frequency of the current from the first current electrode.

6. The method of claim 4, wherein processing includes balancing the two monitor electrodes between the main electrode and a first current electrode such that voltage imbalance is removed by processing of signals to provide a focusing condition.

7. The method of claim 4, wherein the measuring time t is discrete.

8. The method of claim 7, wherein processing includes using a fast Fourier transform or a least-square method on data corresponding to the discrete times.

9. The method of claim 1, further comprising altering a drilling operation based on the apparent resistivity.

10. A method comprising:
operating a tool disposed in a borehole according to a plurality of modes, each mode corresponding to a current pattern emitted from the tool, the tool having a number of current electrodes spaced apart from each other in a first sequence from a main electrode and a number of current electrodes spaced apart from each other in a second sequence from the main electrode, the tool having two monitor electrodes between the main electrode and a first current electrode of the first sequence, two monitor electrodes between the main electrode and a first current electrode of the second sequence, and two monitor electrodes located next to each other between each of two adjoining current electrodes in the first sequence and in the second sequence; and
processing voltages measured from the monitor electrodes of the first sequence, readable voltage differences measured between the two monitor electrodes between the two adjoining current electrodes of the first sequence, and measured currents at a plurality of frequencies according to each mode such that an apparent resistivity of a first mode of the plurality of modes is processed as being inversely proportional to a current emitted from the main electrode and an apparent resistivity for each of the other modes is processed as being inversely proportional to a total current including total current emitted from the main electrode, the first current electrode of the first sequence, and the first current electrode of the second sequence.

11. The method of claim 10, wherein for each mode, the two monitor electrodes between the main electrode and the first current electrode of the first sequence are set to equal voltages by processing signals to provide focusing conditions of the respective mode, and the two monitor electrodes between selected current electrodes of the first sequence with respect to the respective mode are set to equal voltages by processing signals to provide focusing conditions of the respective mode.

12. The method of claim 10, wherein the two monitor electrodes between the main electrode and the first current electrode of the first sequence or the two monitor electrodes between selected adjoining current electrodes of the first sequence are set to equal voltages by adjusting one or more currents flowing from the tool.

13. The method of claim 12, wherein the two monitor electrodes between the main electrode and the first current electrode of the first sequence are set to equal voltages by the adjustment.

14. The method of claim 10, wherein the current emitted from the main electrode of the first mode is emitted at a first frequency and the total current emitted from the main electrode, the first current electrode of the first sequence, and the second current electrode of the second sequence is a first mode current equal to the sum of the current emitted from the main electrode at the first frequency and current from the first current electrodes of the first and second sequences at the first frequency.

15. The method of claim 14, wherein the method includes, for each mode, using the first mode current to determine coefficients that relate total voltages at the two monitor electrodes between the main electrode and the first current electrode of the first sequence to voltages at the two monitor electrodes between the main electrode and the first current electrode of the first sequence at the frequencies of the respective mode.

16. The method of claim 10, further comprising altering a drilling operation based on a result of the processing voltages measured from the monitor electrodes of the first sequence, the readable voltage differences measured between the two monitor electrodes between the two adjoining current electrodes of the first sequence, and the measured currents at a plurality of frequencies according to each mode.

17. A non-transitory machine-readable storage device having instructions stored thereon, which, when performed by a machine, cause the machine to perform operations, the operations comprising:
generating current from a main electrode of a tool disposed in a borehole at a frequency assigned to the main electrode, the tool having a number of current electrodes spaced apart from each other in a sequence from the main electrode, the tool having two monitor electrodes between the main electrode and a first current electrode of the sequence and two monitor electrodes located next to each other between each of two adjoining current electrodes in the sequence;
generating current from each one of the current electrodes in the sequence to a last current electrode in the sequence at a frequency assigned to the current electrode, the assigned frequencies being different from each other;
determining voltages at the monitor electrodes in response to the currents generated from the current electrodes in the sequence;
determining voltage differences between the two monitor electrodes located next to each other between each of two adjoining current electrodes in the sequence in response to the currents generated; and
determining an apparent resistivity based on the determined voltages and the determined voltage differences.

18. The method of claim 17, wherein the operations further comprise altering a drilling operation based on the apparent resistivity.

19. A system comprising:
a tool operable in a borehole, the tool having a number of current electrodes spaced apart from each other in a sequence from a main electrode, the tool having two monitor electrodes between the main electrode and a first current electrode of the sequence and two monitor electrodes located next to each other between each of two adjoining current electrodes in the sequence;
a control unit coupled to the tool, the tool having circuitry to control generation of currents from the tool according to a plurality of modes, each mode corresponding to a current pattern emitted from the tool; and a processing unit coupled to the tool, wherein the system is arranged to operate to:
   generate current from the main electrode of the tool when disposed in the borehole at a frequency assigned to the main electrode;
   generate current from each one of the current electrodes in the sequence to a last current electrode in the sequence at a frequency assigned to the current electrode, the assigned frequencies being different from each other:
   determine voltages at the monitor electrodes in response to the currents generated from the current electrodes in the sequence;
   determine voltage differences between the two monitor electrodes located next to each other between each of two adjoining current electrodes in the sequence in response to the currents generated; and
   determine an apparent resistivity based on the determined voltages and the determined voltage differences.

20. The system of claim 19, wherein the system is arranged to generate an additional current from the main electrode to the last current electrode with the two monitor electrodes between the main electrode and the first current electrode physically set to substantially the same voltage, the additional current at a frequency different from the assigned frequency of the current from the main electrode.

21. The system of claim 20, wherein the system is arranged to set the frequency of the additional current at the assigned frequency of the first current electrode.

22. The system of claim 19, wherein the system is arranged to:
   measure voltage $UM_i(t)$ at each monitor electrode $M_i$, $i=1, 2, 3, \ldots, 2*(N-1)$, and measure voltage differences $\Delta VM_{i,i+1}(t)$ between monitoring electrode located next to each other between two adjoining current electrodes and by superposition form the relationships given by $$UM_i(t) = \sum_{k=0}^{N-1} UM_{i,f_k} \cos(2\pi f_k t + \phi_{i,k}), \ i = 1, 2, 3, \ldots, 2*(N-1)$$

and $$\Delta VM_{i,i+1}(t) = \sum_{k=0}^{N-1} \Delta VM_{i,i+1,f_k} \cos(2\pi f_k t + \phi_{i,i+1,k}),$$

$$i = 1, 3, 5, \ldots, 2*(N-1)-1,$$

where N is the number of current electrodes in the sequence, k=0 refers to the main electrode and k =1... N−1 refers to the current electrodes in the sequence except the last electrode, $UM_{i,f_k}$ is an amplitude of the voltage with frequency $f_k$ at the $i^{th}$ monitoring electrode, t is measuring time for each logging position, $\phi_{i,k}$ is initial phase with respect to frequency $f_k$ on the $i^{th}$ monitor, $\Delta VM_{i,i+1,f_k}$ is an amplitude of the voltage with frequency $f_k$ between $i^{th}$ and $(i+1)^{th}$ monitor electrodes, and $\phi_{i,i+1,k}$ is the initial phase of $\Delta VM_{i,i+1,f_k}$ with frequency $f_k$; and
   processing the relationships, determining each $UM_{i,f_k}$, $\phi_{i,k}$, $\Delta VM_{i,i+1,f_k}$ and $\phi_{i,i+1,k}$.

23. The system of claim 22, wherein currents, $I_{k,f_k}$, emitted by the main electrode and the current electrodes, other than the last electrode, are recorded as $I_{0,f_0}, I_{1,f_1}, \ldots, I_{(N-1),f_{N-1}}$ in a memory device, or as $I_{0,f_0}, I_{0,f_1}, I_{1,f_1}, \ldots, I_{(N-1),f_{N-1}}$ with $I_{0,f_1}$ being an additional current generated from the main electrode to the last current electrode with the two monitor electrodes between the main electrode and the first current electrode physically set to substantially the same voltage, the additional current at the frequency of the current from the first current electrode.

24. The system of claim 22, wherein the system arranged to process the relationships includes the system arranged to balance the two monitor electrodes between the main electrode and a first current electrode such that voltage imbalance is removed by processing of signals to provide a focusing condition.

25. The system of claim 22, wherein the measuring time t is discrete.

26. The system of claim 25, wherein the system arranged to process the relationships includes the system arranged to use a fast Fourier transform or a least-square method on data corresponding to the discrete times.

27. The system of claim 19, wherein the system is further arranged to alter a drilling operation based on based on the apparent resistivity.

28. A system comprising:
   a tool operable in a borehole, the tool having a number of current electrodes spaced apart from each other in a first sequence from a main electrode and a number of current electrodes spaced apart from each other in a second sequence from the main electrode, the tool having two monitor electrodes between the main electrode and a first current electrode of the first sequence, two monitor electrodes between the main electrode and a first current electrode of the second sequence, and two monitor electrodes located next to each other between each of two adjoining current electrodes in the first sequence and in the second sequence;
   a control unit coupled to the tool, the tool having circuitry to control generation of currents from the tool according to a plurality of modes, each mode corresponding to a current pattern emitted from the tool; and
   a processing unit coupled to the tool, wherein the system is arranged to process voltages measured from the monitor electrodes of the first sequence, process readable voltage differences measured between the two monitor electrodes between the two adjoining current electrodes of the first sequence, and process measured currents at a plurality of frequencies according to each mode such that an apparent resistivity of a first mode of the plurality of modes is processed as being inversely proportional to a current emitted from the main electrode and an apparent resistivity for each of the other modes is processed as being inversely proportional to a total current including total current emitted from the main electrode, the first current electrode of the first sequence, and the first current electrode of the second sequence.

29. The system of claim 28, wherein for each mode, the system is arranged to set the two monitor electrodes between the main electrode and the first current electrode of the first sequence to equal voltages by processing signals to provide focusing conditions of the respective mode, and the system is arranged to set the two monitor electrodes between selected current electrodes of the first sequence with respect to the respective mode to equal voltages by processing signals to provide focusing conditions of the respective mode.

30. The system of claim 28, wherein the system is arranged to set the two monitor electrodes between the main electrode and the first current electrode of the first sequence or the two monitor electrodes between selected adjoining current electrodes of the first sequence to equal voltages by adjusting one or more currents flowing from the tool.

31. The system of claim 30, wherein the system is arranged to set the two monitor electrodes between the main electrode and the first current electrode of the first sequence to equal voltages by the adjustment.

32. The system of claim 28, wherein the system is arranged to emit the current emitted from the main electrode of the first mode at a first frequency and the system is arranged to emit the total current emitted from the main electrode. the first current electrode of the first sequence, and the second current electrode of the second sequence as a first mode current equal to the sum of the current emitted from the main electrode at the first frequency and current from the first current electrodes of the first and second sequences at the first frequency.

33. The system of claim 32, wherein the system is arranged to, for each mode, use the first mode current to determine coefficients that relate total voltages at the two monitor electrodes between the main electrode and the first current electrode of the first sequence to voltages at the two monitor electrodes between the main electrode and the first current electrode of the first sequence at the frequencies of the respective mode.

34. The system of claim 28, wherein the system is further arranged to alter a drilling operation based on based on a result of the process of voltages measured from the monitor electrodes of the first sequence, the readable voltage differences measured between the two monitor electrodes between the two adjoining current electrodes of the first sequence, and the measured currents at a plurality of frequencies according to each mode.

\* \* \* \* \*